(12) United States Patent
Xu et al.

(10) Patent No.: US 8,904,371 B2
(45) Date of Patent: Dec. 2, 2014

(54) DATA HANDLING AMONG ACTORS IN A DATAFLOW PROGRAMMING ENVIRONMENT

(75) Inventors: Charles Chen Xu, Lund (SE); Johan Eker, Lund (SE); Carl Von Platen, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 186 days.

(21) Appl. No.: 13/527,568

(22) Filed: Jun. 19, 2012

(65) Prior Publication Data
US 2013/0339923 A1 Dec. 19, 2013

(51) Int. Cl.
*G06F 9/45* (2006.01)

(52) U.S. Cl.
USPC ........... 717/155; 717/106; 717/151; 717/154; 717/156

(58) Field of Classification Search
None
See application file for complete search history.

(56) References Cited

U.S. PATENT DOCUMENTS

| | | | | |
|---|---|---|---|---|
| 5,907,711 | A * | 5/1999 | Benitez .................... | 717/145 |
| 6,865,429 | B1 * | 3/2005 | Schneider et al. ............. | 700/86 |
| 7,467,371 | B1 * | 12/2008 | Meredith et al. .............. | 717/104 |
| 7,761,272 | B1 | 7/2010 | Janneck et al. | |
| 2003/0167307 | A1 * | 9/2003 | Filepp et al. .................. | 709/205 |
| 2008/0098208 | A1 * | 4/2008 | Reid et al. .................... | 712/234 |
| 2009/0063515 | A1 * | 3/2009 | Bar-Or et al. ................ | 707/100 |
| 2010/0241828 | A1 * | 9/2010 | Yu et al. ........................ | 712/30 |
| 2011/0055155 | A1 * | 3/2011 | Page et al. .................... | 707/625 |
| 2011/0191761 | A1 * | 8/2011 | Doyle et al. .................. | 717/156 |
| 2012/0144158 | A1 * | 6/2012 | Papakipos et al. ............. | 712/34 |
| 2013/0125097 | A1 * | 5/2013 | Ebcioglu et al. ............. | 717/136 |

FOREIGN PATENT DOCUMENTS

| | | |
|---|---|---|
| EP | 1783604 A3 | 10/2007 |
| WO | 2005/114394 A2 | 12/2005 |

OTHER PUBLICATIONS

Papakonstantinou, G. et al. "Attribute grammars and dataflow computing" Information and Software Technology, Jun. 1, 1998, Elsevier Publishers, Amsterdam, NL, 30, 5, pp. 306-313, ISSN: 0650-5849.
Girault, A. "Elimination of redundant messages with a two-pass static analysis algorithm" Parallel Computing, Mar. 1, 2002, Elsevier Publishers, Amsterdam, NL, 28, 3, pp. 433-453, ISSN: 0167-8191.

(Continued)

*Primary Examiner* — Chameli Das
(74) *Attorney, Agent, or Firm* — Leffler Intellectual Property Law, PLLC; Kenneth B. Leffler

(57) ABSTRACT

Processing a dataflow program by a program development tool includes detecting a pair of actors defined by dataflow program instructions, wherein the pair of actors include a producer actor and a consumer actor, the producer actor supplying a data structure to the consumer actor via a path that comprises at least one connection and possibly also intervening other actors. An analysis is performed including analyzing one or more operations of the producer actor that involve the data structure and/or analyzing one or more operations of the consumer actor that involve the data structure. A result of the analysis is used as a basis for selecting a minimal amount of information from among a plurality of data handling possibilities concerning the data structure. A transformed program is produced in which the selected minimal amount of information is caused to be passed from the producer actor to the consumer actor.

29 Claims, 17 Drawing Sheets

(56) References Cited

OTHER PUBLICATIONS

Choi, C. et al. "Software synthesis for dynamic flow graph" Rapid System Prototyping, 1997. Shortening the Path from Specification to Prototype. Proceedings, 8th IEEE International Workshop on, Chapel Hill, NC, USA, Jun. 24-26, 1997, Los Alamitos, CA, USA, IEEE Comput. Soc, US, pp. 72-79.

Mitschele-Thiel, A. "Integrating model-based optimization and program transformation to generate efficient parallel programs" Journal of Systems Architecture, Jan. 1, 1999, Elsevier BV, NL, 45, 6-7, pp. 465-482.

Eker, J. et al. "CAL Language Report—Specification of the CAL actor language" Language Version 1.0, Document Edition 1. ERL Technical Memo UCB/ERL M03/48, University of California at Berkeley, Dec. 1, 2003.

Lee, E. A. et al. "Dataflow Process Networks" Proceedings of the IEEE, vol. 83, No. 5, May 1995, pp. 773-799.

Aho, A. V. et al. "Compilers—Principles, Techniques, and Tools" Addison-Wesley Publishing Company, USA, 1985, ISBN: 0-201-10194-7, pp. 631-633.

\* cited by examiner

DATA HANDLING AMONG ACTORS IN A DATAFLOW PROGRAMMING ENVIRONMENT

BACKGROUND

The present invention relates to dataflow programming environments, and more particularly to data handling among actors in a dataflow programming environment.

Dataflow modeling is emerging as a promising programming paradigm for streaming applications for multicore hardware and parallel platforms in general. This more constrained programming model benefits high-level transformations and facilitates advanced code optimizations and run-time scheduling.

A dataflow program is made up of a number of computational kernels, (called "actors" or "functional units") and connections that specify the flow of data between the actors. An important property of a dataflow program is that the actors only interact by means of the flow of data over the connections: there is no other interaction. In particular, actors do not share state. The absence of shared state makes a dataflow program relatively easy to parallelize: the actors can execute in parallel, with each actors execution being constrained only by the requirement that all of its inputs be available.

FIG. 1 illustrates an exemplary graphical representation of a dataflow program 100 having seven actors, identified with respective reference numerals A, B, C, D, E, F, and G. The actors A, B, C, D, E, F, and G carry out their functions by means of their code (i.e., program instructions) being executed within a processing environment 101 that comprises one or more programmable processors 103 that retrieve program instructions and data from one or more non-transitory processor readable storage media (e.g., as represented by memory 105). Connections between the actors are indicated by arrows. The dataflow program 100 illustrates that an actor can have one or more input connections, and can have any number of output connections, including none. For example, actor G lacks any output ports, and is consequently commonly referred to as a "sink". A sink does not affect the state of the other actors. In practice, sinks typically represent interaction with the environment in which the dataflow program executes. For example, a sink could represent an actuator, an output device, or the like. A sink could also represent a system that has not yet been implemented, in which case the sink mimics the missing subsystem's demand for input.

Feedback loops can be formed as illustrated in this example by actors C, D, E, and F forming a cycle, and also by actor B having a self-loop. It will be observed that feedback limits parallelism, since an actor's firing (i.e., its execution) may have to await the presence of input data derived from one of its earlier firings.

Communication between actors occurs asynchronously by means of the passing of so-called "tokens", which are messages from one actor to another. These messages can represent any type of information (e.g., numeric, alphabetic, program-defined values, etc.), with the particular type of information in any one case being defined by the dataflow program. As used herein, the term "value" refers to the particular information (as distinguished from the information type or range of possible information instances) represented by a token or instance of an actor state without any limitation regarding whether that value is numeric, alphabetic, or other, and without regard to whether the information is or is not a complex data structure (e.g., a data structure comprising a plurality of members, each having its own associated value).

The dataflow programming model is a natural fit for many traditional Digital Signal Processing (DSP) applications such as, and without limitation, audio and video coding, radio baseband algorithms, cryptography applications, and the like. Dataflow in this manner decouples the program specification from the available level of parallelism in the target hardware since the actual mapping of tasks onto threads, processes and cores is not done in the application code but instead in the compilation and deployment phase.

In a dataflow program, each actor's operation may consist of a number of actions, with each action firing as soon as all of its required input tokens become valid (i.e., are available) and, if one or more output tokens are produced from the actor, there is space available in corresponding output port buffers. Whether the firing of the action occurs as soon as it is instructed to do so or whether it must nonetheless wait for one or more other activities within the actor to conclude will depend on resource usage within the actor. Just as the firing of various actors within a dataflow program may be able to fire concurrently or alternatively may require some sort of sequential firing based on their relative data dependence on one another, the firing of various actions within an actor can either be performed concurrently or may alternatively require that some sequentiality be imposed based on whether the actions in question will be reading or writing the same resource; it is a requirement that only one action be able to read from or write to a resource during any action firing.

An input token that, either alone or in conjunction with others, instigates an action's firing is "consumed" as a result (i.e., it is removed from the incoming connection and ceases to be present at the actor's input port). An actor's actions can also be triggered by one or more state conditions, which include state variables combined with action trigger guard conditions and the action scheduler's finite state machine conditions. Guard conditions may be Boolean expressions that test any persistent state variable of the actor or its input token. (A persistent state variable of an actor may be modeled, or in some cases implemented, as the actor producing a token that it feeds back to one of its input ports.) One example (from among many) of a dataflow programming language is the CAL language that was developed at UC Berkeley The CAL language is described in "CAL Language Report: Specification of the CAL actor language, Johan Eker and km W. Janneck, Technical Memorandum No. UCB/ERL M03/48, University of California, Berkeley, Calif., 94720, USA, Dec. 1, 2003", which is hereby incorporated herein by reference in its entirety. In CAL, operations are represented by actors that may contain actions that read data from input ports (and thereby consume the data) and that produce data that is supplied to output ports. The CAL dataflow language has been selected as the formalism to be used in the new MPEG/RVC standard ISO/IEC 23001-4 or MPEG-B pt. 4. Similar programming models are also useful for implementing various functional components in mobile telecommunications networks.

Typically, the token passing between actors (and therefore also each connection from an actor output port to an actor input port) is modeled (but not necessarily implemented) as a First-In-First-Out (FIFO) buffer, such that an actor's output port that is sourcing a token pushes the token into a FIFO and an actor's input port that is to receive the token pops the token from the FIFO. An important characteristic of a FIFO (and therefore also of a connection between actor output and input ports) is that it preserves the order of the tokens contained therein; the reader of the FIFO receives the token in the same order in which that token was provided to the FIFO. Also, actors are typically able to test for the presence of tokens in a FIFO connected to one of the actor's input ports, and also to ascertain how many tokens are present in a FIFO, all without having to actually pop any tokens (and thereby remove the data from the FIFO).

The interested reader may refer to U.S. Pat. No. 7,761,272 to Janneck et al., which is hereby incorporated herein by reference in its entirety. The referenced document provides an overview of various aspects of dataflow program makeup and functionality.

Typical applications in the signal processing domain operate on data streams. This characteristic makes it convenient to specify such applications as dataflow programs. Other applications, however, require that data structures be shared between different parts of the application. Conventional implementations of dataflow programs include passing a data structure between actors by means of copying of the structure.

The inventors of the subject described herein have ascertained that there are situations in which the entire structure is replicated from the output of one actor to the input of another actor when the actor receiving the data structure only requires a subset of that structure to fire its actions. This in turn leads to excessive copying of data, which reduces computing efficiency. It is therefore desirable to have improved data handling methods and apparatuses for use in connection with dataflow programs.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for processing a dataflow program by a program development tool. Such processing includes the program development tool detecting a pair of actors defined by dataflow program instructions, wherein the pair of actors include a producer actor and a consumer actor, the producer actor supplying a data structure to the consumer actor via a path that comprises at least one connection and possibly (but not necessarily) also intervening other actors. An analysis is performed including analyzing one or more operations of the producer actor that involve the data structure and/or analyzing one or more operations of the consumer actor that involve the data structure. A result of the analysis is used as a basis for selecting a minimal amount of information from among a plurality of data handling possibilities concerning the data structure. A transformed program is produced in which the selected minimal amount of information is caused to be passed from the producer actor to the consumer actor.

In some but not necessarily all embodiments, analyzing one or more operations of the producer actor comprises ascertaining whether the producer actor modifies the data structure.

In some but not necessarily all embodiments, the data structure comprises a plurality of members; and analyzing one or more operations of the producer actor comprises ascertaining whether the producer actor modifies some but not all of the members of the data structure.

In some but not necessarily all embodiments, the data structure comprises a plurality of members; and analyzing one or more operations of the consumer actor comprises ascertaining whether only a subset of input data structure members consisting of fewer than all of the input data structure members is needed for the consumer actor to fire.

In some but not necessarily all embodiments, analyzing one or more operations of the consumer actor comprises ascertaining whether the consumer actor needs to know only whether the data structure is present in order for the consumer actor to fire.

In some but not necessarily all embodiments, the data structure comprises a plurality of members; and the plurality of data handling possibilities concerning the data structure includes a subset of input data structure members consisting of fewer than all of the input data structure members.

In some but not necessarily all embodiments, the data structure comprises a plurality of members; and the plurality of data handling possibilities concerning the data structure includes a combination of a subset of data structure members consisting of fewer than all of the data structure members and a reference to remaining data structure members that are not in the subset of data structure members.

In some but not necessarily all embodiments, the plurality of data handling possibilities concerning the data structure includes a reference to the data structure.

In some but not necessarily all embodiments, the plurality of data handling possibilities concerning the data structure includes an indicator of data structure presence that does not include any data structure values.

In some but not necessarily all embodiments, the path comprises one or more intervening other actors, and the analysis comprises analyzing one or more operations of the one or more intervening other actors that involve the data structure.

In some but not necessarily all embodiments, the analysis comprises ascertaining whether the producer actor generates a modified member of a data structure; and if the actor generates the modified member of the data structure, ascertaining whether the actor can replace an original member of the data structure with the modified member of the data structure. Also, producing the transformed program in which the selected minimal amount of information is caused to be passed from the producer actor to the consumer actor comprises producing the transformed program such that the transformed program defines the actor replacing the original member of the data structure with the modified member of the data structure if a predicate is satisfied, wherein the predicate includes whether the actor can replace the original member of the data structure with the modified member of the data structure.

In some but not necessarily all embodiments, the analysis comprises performing a live member analysis to determine whether one or more members of the data structure are live on the at least one connection of the path.

In some but not necessarily all embodiments, the analysis comprises determining connections of the path over which the data structure can be represented as a reference; and determining, over each of the connections of the path, what members of the data structure, if any, have a potential of being modified prior to reaching the consumer actor.

In some but not necessarily all embodiments, producing the transformed program in which the selected minimal amount of information is caused to be passed from the producer actor to the consumer actor comprises producing source code of a transformed dataflow program.

In some but not necessarily all embodiments, the analysis comprises iteratively analyzing connections of the path such that if there is a connection, $c$, on which a total size of modified members of the data structure exceeds a threshold value, then one or more predecessor actors of the connection c are added to a set of actors that will construct a reference to the data structure.

DETAILED DESCRIPTION

Figure 1:
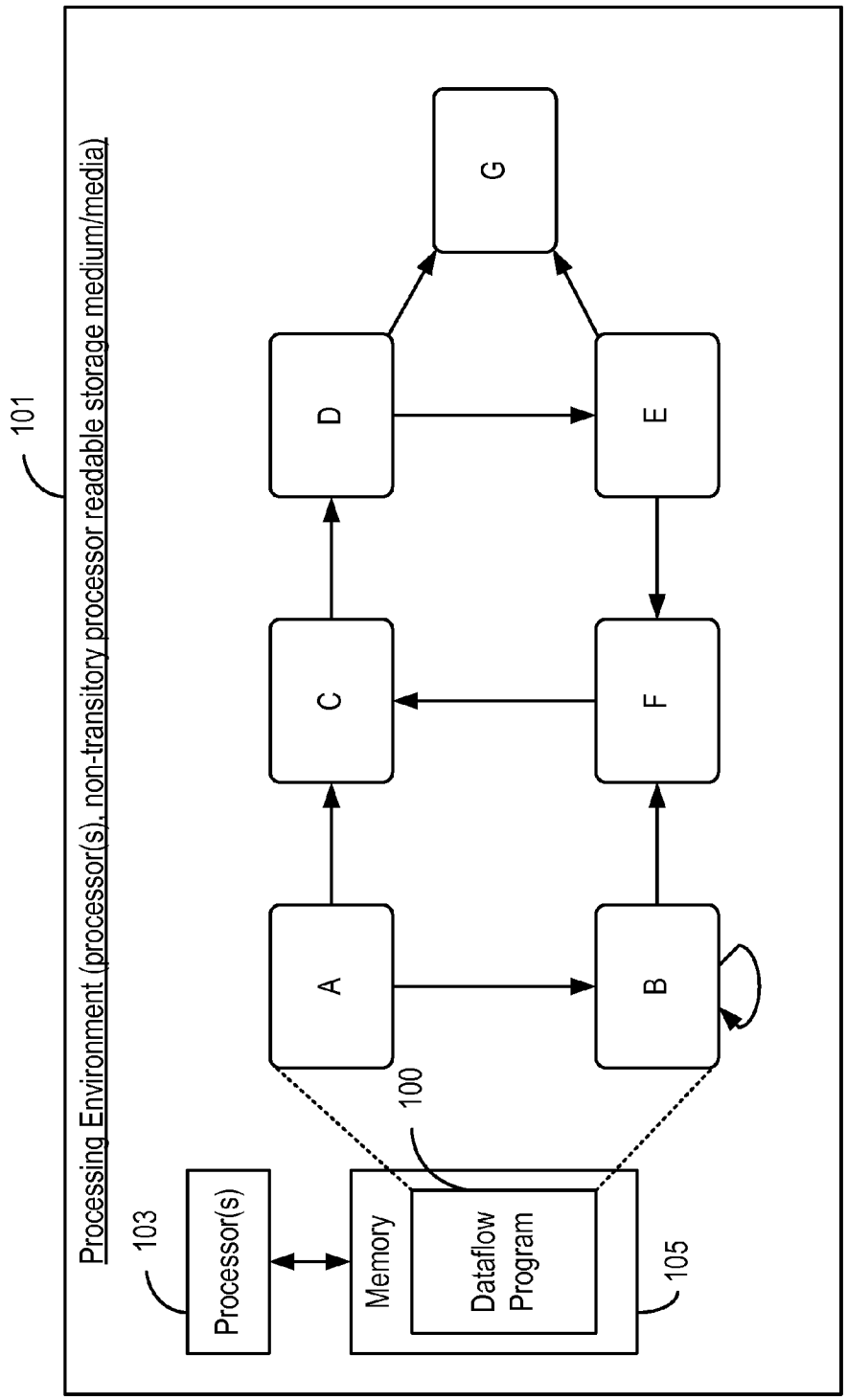
FIG. 1 illustrates an exemplary graphical representation of a dataflow program having seven actors.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, data sharing between actors in a dataflow program is implemented in an efficient way that seeks to avoid, whenever possible, the copying of an entire data structure from one actor to another. A liveness analysis (also called a "live variable analysis") is performed on the dataflow program source code to determine, for every actor defined by the dataflow program, what information is required for the actor to fire. This analysis is possible because dataflow formalism makes data dependency explicit. A goal of the analysis is to determine the status of individual members/fields of a structure that a producer sends to a consumer. This is achieved by treating each member/field as a distinct variable. Unless a member is "live" (meaning that there is a possibility that it will be used) there is no reason to transfer it at all.

In another aspect of embodiments consistent with the invention, during actor runtime, instead of always passing an entire data structure (comprising all of that data structure's members), a more economical representation is used when possible.

In an aspect of some embodiments consistent with the invention, information that is passed from one actor to another is a subset of data structure members consisting of fewer than all of the data structure members. This eliminates processing resources consumed by copying unneeded data structure members.

In another aspect of some embodiments consistent with the invention, information that is passed from one actor to another is merely a reference (i.e., to a memory or other storage location) to an original data structure. This is quite efficient, and can be used for example if the actor from which the data structure is being passed has not modified the data structure. The implementation of such references depends on deployment. For example, a reference can be implemented as a pointer to shared memory, an address into a remote address space, the parameters required to initiate a DMA (direct memory access) transfer from a peripheral that implements the communication link to a remote node, and the like. It may also be the case that access via a reference is infeasible or inefficient, given a particular deployment of a producer/consumer pair. In this case live members will be copied from one actor output port to an actor input port.

In another aspect of embodiments consistent with the invention, information that is passed from one actor to another is a combination of a subset of data structure members consisting of fewer than all of the data structure members and one or more references to remaining data structure members that are not in the subset of data structure members. In this manner, only the members of the data structure that have been modified by the actor need to be copied to a consumer actor, with remaining members of the data structure being made available to the consumer actor by means of the reference(s) to the remaining members and/or entire original data structure.

In another aspect of embodiments consistent with the inventions, the information that is passed from one actor to another is an indicator of whether the data structure is present (e.g., in the form of a void token). This is useful when the consumer actor that is defined by the dataflow program as receiving the data structure does not use any values associated with the data structure, but is only interested in the presence of input.

These and other aspects are described in the following.

Assume that a dataflow program has been created and is stored in a non-transitory computer readable storage medium, such as but not limited to an electronic, magnetic, or optical storage medium. The dataflow program will include any number of actors, but for the sake of illustration, the focus will be on two actors such as a first actor 301 and a second actor 303 as shown in FIGS. 3A through 3E. Although in general the first actor 301 could supply any number of outputs to any number of other actors (including a loop to itself), for the sake of simplicity the first actor 301 is shown producing only a single token (i.e., a single information item) onto a connection that links the first and second actors 301, 303, and this token is made available for consumption by the second actor 303. As the consumer of the first actor's information (token), the second actor 303 is herein referred to as a "consumer actor". Similarly, as the producer of the information (token) that is supplied to the connection linking the first and second actors 301, 303, the first actor 301 is herein referred to as a "producer actor."

Also for the sake of simplicity, although the second actor 303 can generally receive any number of inputs from any number of other actors (including from itself), the second actor 303 is herein depicted receiving only a single information item, and this being supplied from just one actor, namely the first actor 301.

Figure 2:
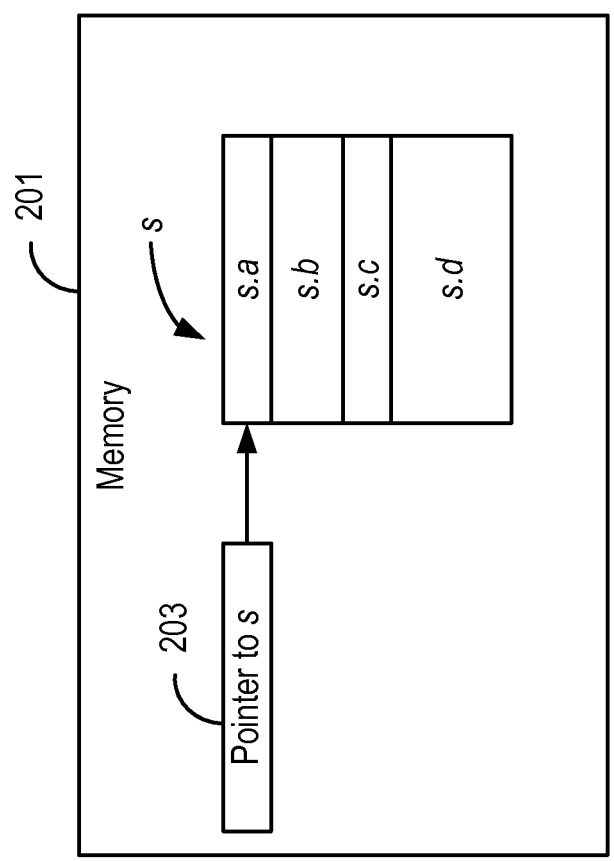
FIG. 2 illustrates an exemplary memory (i.e., any type of non-transitory computer readable storage medium) in which is stored an exemplary data structure s.

To illustrate various aspects of embodiments consistent with the invention, a data structure in its entirety will be represented by the letter s. Assume for the sake of example that the data structure is made up of four members, herein denoted a, b, c, and d. References to any particular one of these members will herein be represented by the notation "s.[member]", where "[member]" in this case can be any of the members a, b, c, and d. For example, a reference to member "a" is denoted "s.a". The notations "s.b","s.c", and "s.d" similarly refer to the members b, c, and d, respectively. FIG. 2 illustrates an exemplary memory 201 (i.e., any type of non-transitory computer readable storage medium) in which is stored an exemplary data structure s. The data structure s is made up of four members, denoted s.a, s.b, s.c, and s.d, respectively. Also shown is a reference 203 to s. The reference 203 is data that represents a memory address (or comparable information) that can be used to access the beginning of the data structure s in the memory 201.

As explained earlier, data handling in a conventional dataflow program includes copying data structures in their entirety regardless of whether the actor that is sourcing the data structure has modified it and regardless of whether the actor that is receiving the data structure needs all members of the data structure in order to fire its actions (i.e., there is no analysis of what information actually needs to be passed from one actor to another). However, in accordance with an aspect of embodiments consistent with the invention, here it is ascertained, for each input data structure that is defined by the dataflow program as being supplied to an actor, what members, if any, of the input data structure are required for the actor to fire. This analysis can, in theory, be carried out manually (e.g., by a program code developer). However, this has disadvantages at least in that it is tedious, error prone, and renders the program in such a form that it becomes difficult to understand and maintain.

It is therefore preferred that an automated approach be taken, in which the analysis of the dataflow program be carried out in an automated fashion, such as by a program development tool (or equivalently, chain of tools). The program development tool analyzes the data handling defined by the dataflow program, and transforms the program into another form. Such a transformation can be modeled as a source-to-source transformation of the program. The transformed program can be at the same level of abstraction as the original dataflow program from which it derived. In such embodiments, the transformed program can then be supplied to a dataflow program compiler or interpreter in place of the original dataflow program.

In some alternative embodiments, a program development tool produces a transformed program that is a representation of the original dataflow program, wherein the representation is suitable as input to an interpreter (or virtual machine) that is particularly designed for the execution of dataflow programs.

In yet other alternative embodiments, a program development tool transforms the original dataflow program into "virtual instructions" (or "byte code") for an interpreter that is not particularly designed for the execution of dataflow programs. For example, and without limitation, the original dataflow program can be transformed into Java byte code.

In still other alternative embodiments, a program development tool transforms the original dataflow program into a representation consisting of virtual instructions (e.g., byte code) that are partly or entirely translated into executable code that is native to a particular target architecture, at runtime using so-called "just-in-time" compilation.

Yet another set of alternatives involve translating the original dataflow program into a different high-level language (e.g., Java, C, etc.) and then leveraging on existing compilers and interpreters. One could also generate an intermediate representation of the transformed source program that is employed by a particular compiler back end (e.g., LLVM, formerly "Low Level Virtual Machine"). Assembly language for a particular target architecture can be viewed as an intermediate representation, in this case object code generated by an assembler.

In still other alternatives, parts of the entire transformed program are implemented in hardware. This can involve translation into other source languages such as, without limitation, Verilog or VHDL, or intermediate representations.

It is further noted that the dataflow program can be distributed over several machines, employing several of the above-mentioned alternatives in concert.

Based on the results of the ascertaining operation mentioned above, for each input data structure that is defined by the dataflow program as being supplied from one actor to another, the receiving (consuming) actor is caused to receive only the minimal amount of information that is actually necessary for that receiving actor to fire. What constitutes the minimal amount of information will be based on the results of the ascertaining operation, and will have different forms under different circumstances. These are discussed in the following.

FIGS. 3A through 3E illustrate aspects of exemplary embodiments consistent with the invention. Each of these figures illustrates a dataflow program segment involving a first actor 301 that is coded to supply a data structure to a second actor 303. In an aspect of embodiments consistent with the invention, an analyzer 305 is also provided that has access to the program code that defines each of the first and second actors 301, 303. The analyzer 305 can be, for example, a part of a development tool that is run on one or more processing devices that may or may not be the same one(s) on which the dataflow program itself is intended to run. The analyzer 305 can be implemented in any (or a combination) of the types of embodiments described above. Based upon what the analyzer 305 ascertains about the first and second actors 301, 303, the data passing between the first and second actors 301, 303 is made more efficient (e.g., by the analyzer 305 causing transformed program code to be generated that does not automatically copy an entire data structure from the first actor 301 to the second actor 303 regardless of whether it is all needed).

Figure 3A:
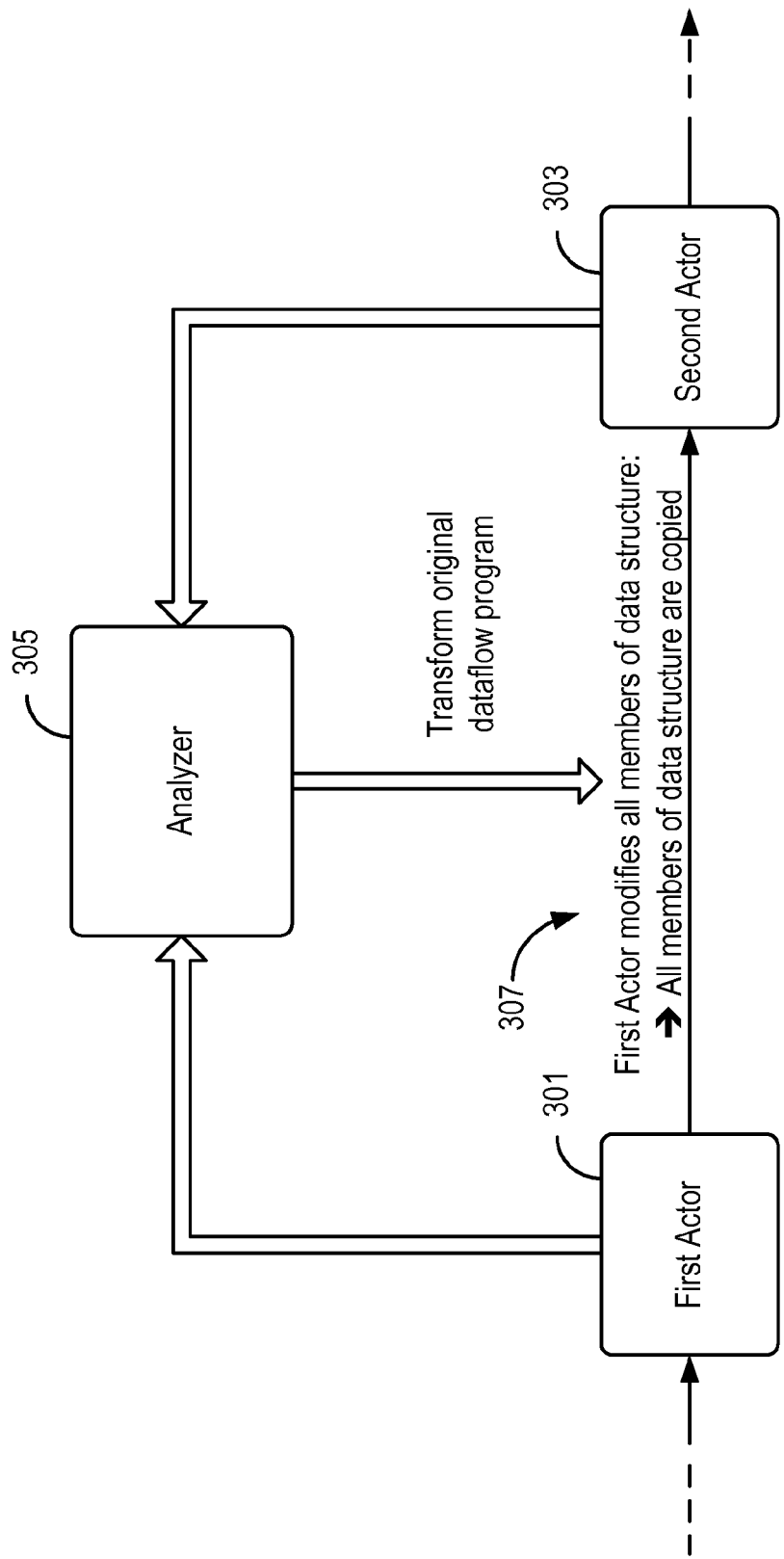
FIGS. 3A through 3E illustrate aspects of exemplary embodiments consistent with the invention.

Considering first the circumstances depicted in FIG. 3A, it is here assumed that the analyzer 305 has examined the program instructions (e.g., retrieved from a computer-readable storage device) that represent the first and second actors 301, 303 and has ascertained that the first actor 301 modifies all members of the data structure to be supplied to the second actor 303. Based on the results of this ascertaining, the analyzer 305 causes (step 307) all members of the data structure to be copied from the first actor 301 to the second actor 303. This is preferably done only if it is further ascertained that the modified members of the data structure are all "live" (i.e., there is a possibility that they will be used by the second actor 303), because there is no need to copy even modified members if they are ascertained to be "dead".

Figure 3B:
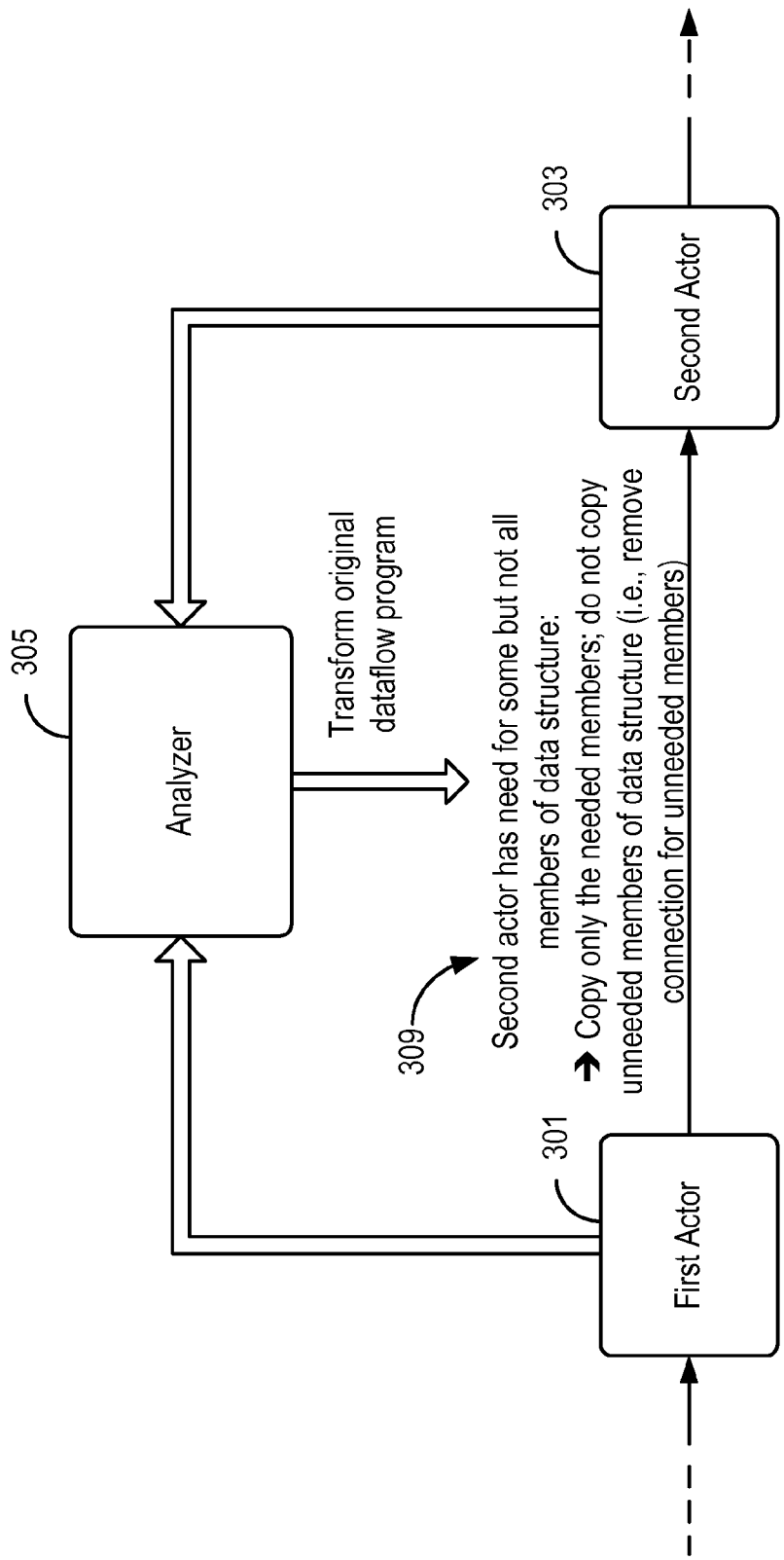

Considering now the circumstances depicted in FIG. 3B, it is here assumed that the analyzer 305 has examined the program instructions (e.g., retrieved from a computer-readable storage device) that represent the first and second actors 301, 303 and has ascertained that the second actor 303 has a need for some but not all of the members of the data structure to be supplied to the second actor 303. Based on the results of this ascertaining, the analyzer 305 causes (step 309) only the needed members of the data structure to be copied from the first actor 301 to the second actor 303. These will therefore be a subset of the input data structure members consisting of fewer than all of the input data structure members.

Figure 3C:
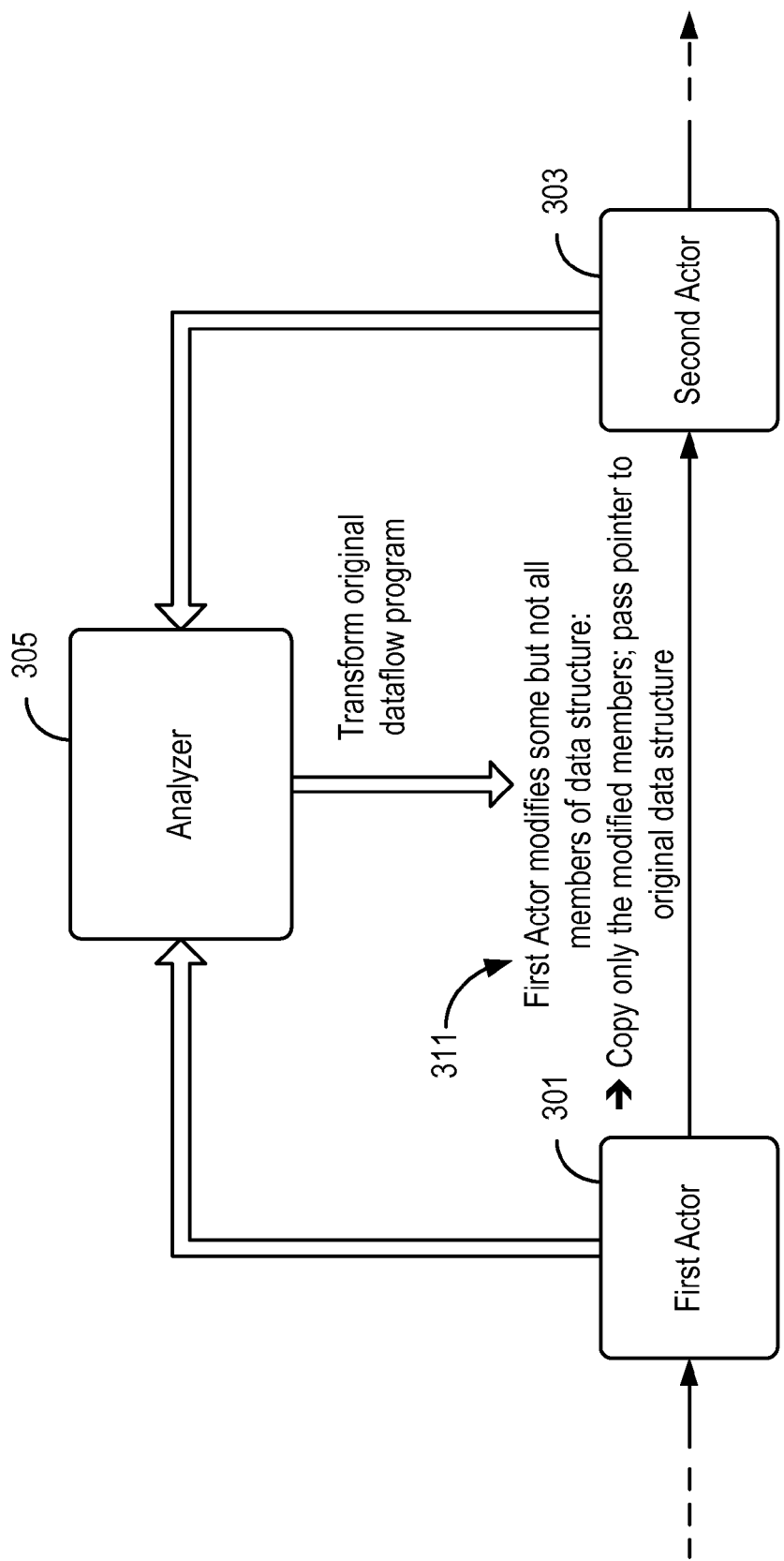

Considering now the circumstances depicted in FIG. 3C, it is here assumed that the analyzer 305 has examined the program instructions (e.g., retrieved from a computer-readable storage device) that represent the first and second actors 301, 303 and has ascertained that the first actor 301 modifies some but not all members of the data structure that, according to the dataflow program, is to be supplied to the second actor 303. Based on the results of this ascertaining, the analyzer 305 causes (step 311) only the modified members of the data structure to be copied from the first actor 301 to the second actor 303, and also causes a reference to the original data structure to be passed to the second actor 303. In this way, the second actor 303 can get access to other (non-modified) members of the data structure, if needed.

Figure 3D:
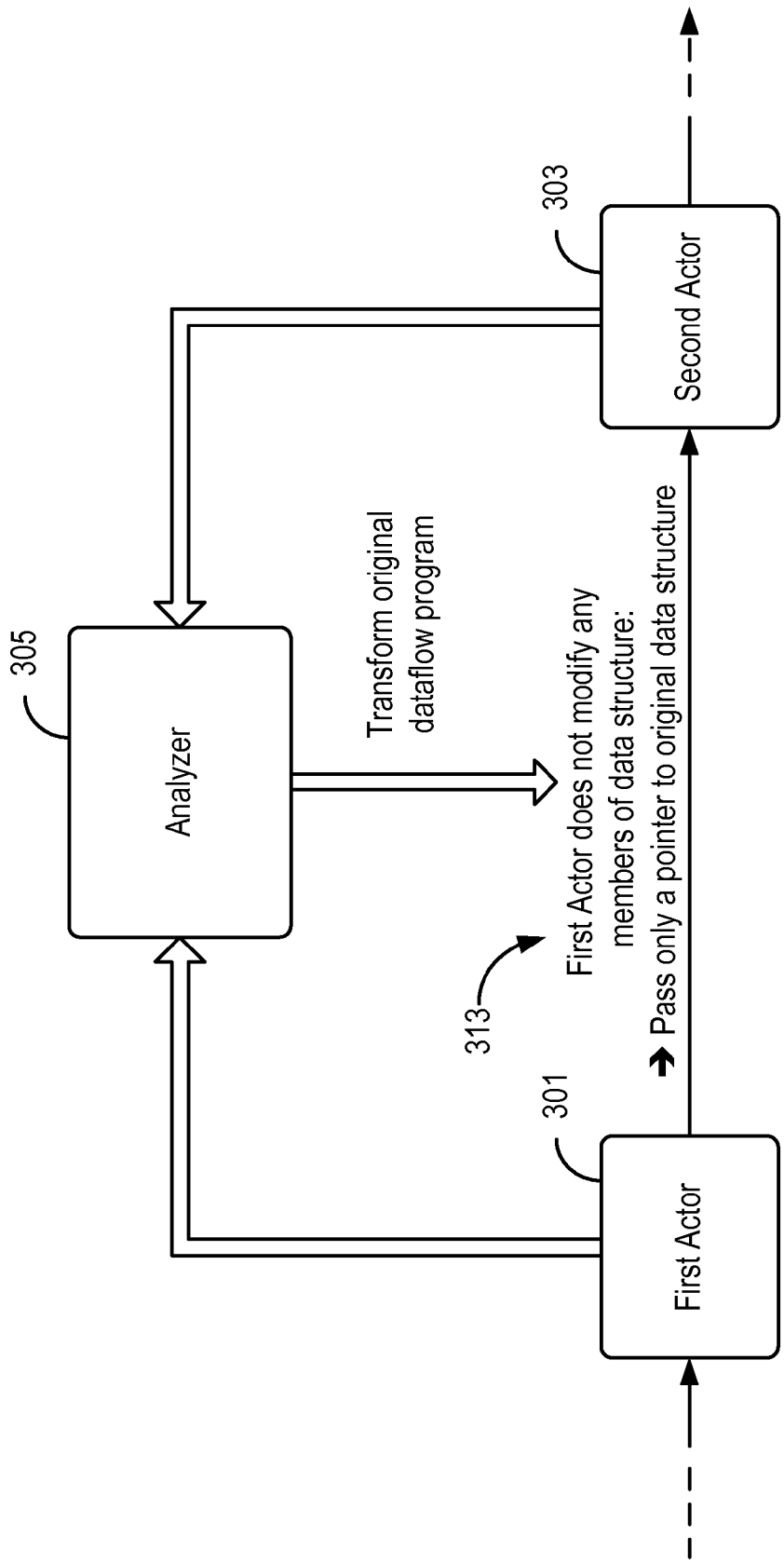

Considering now the circumstances depicted in FIG. 3D, it is here assumed that the analyzer 305 has examined the program instructions (e.g., retrieved from a computer-readable storage device) that represent the first and second actors 301, 303 and has ascertained that the first actor 301 does not modify any members of the data structure that, according to the dataflow program, is to be supplied to the second actor 303. Based on the results of this ascertaining, the analyzer 305 causes (step 313) only a reference to the original data structure to be passed to the second actor 303. In this way, the second actor 303 can get access to any members of the data structure that it may need.

Figure 3E:
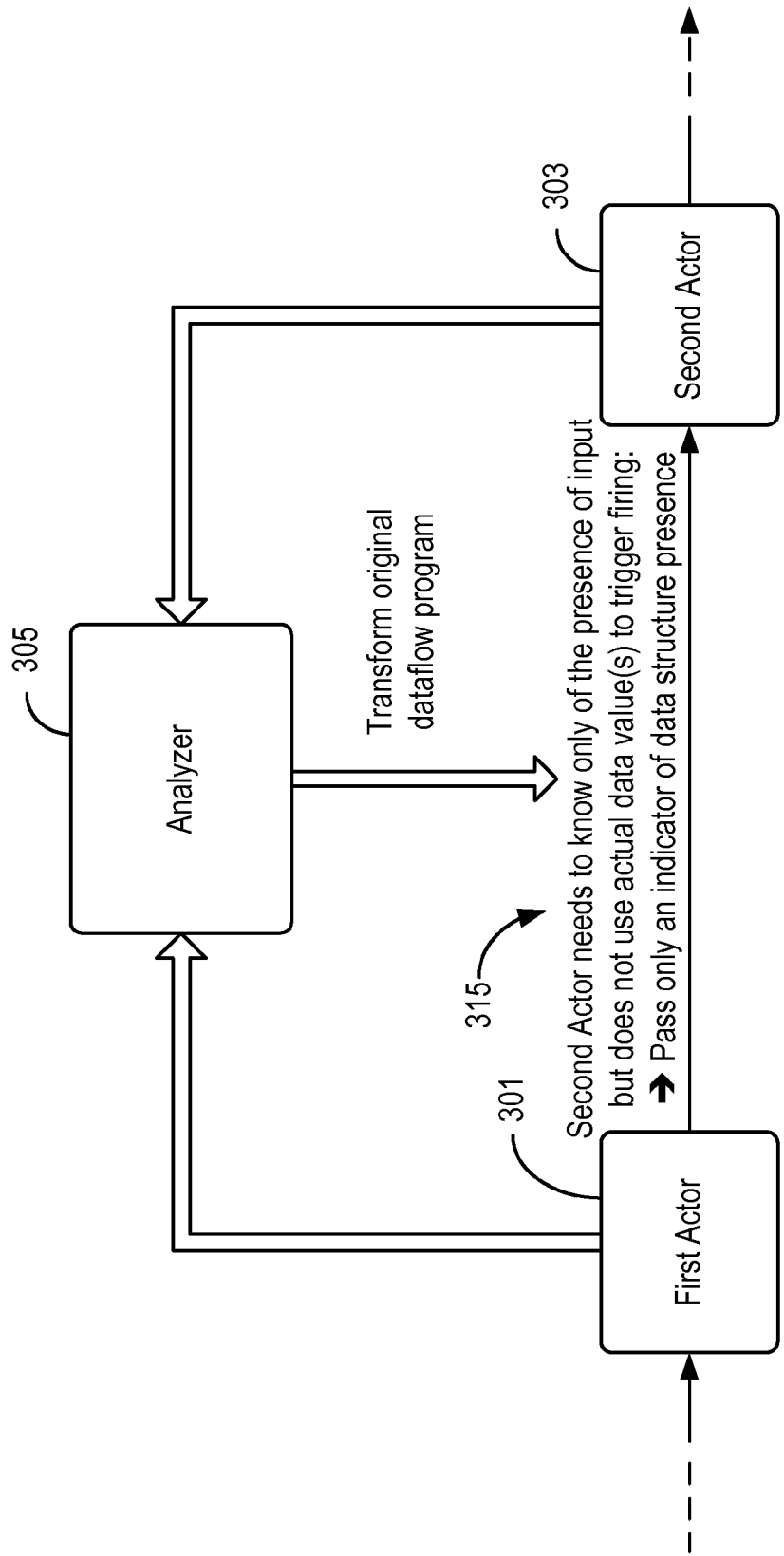

Considering now the circumstances depicted in FIG. 3E, it is here assumed that the analyzer 305 has examined the program instructions (e.g., retrieved from a computer-readable storage device) that represent the first and second actors 301, 303 and has ascertained that the second actor 303 merely needs to know only of the presence of the input data structure in order to trigger its firing. The second actor 303 does not use any of that data structure's member's actual data values. Based on the results of this ascertaining, the analyzer 305 causes (step 315) only an indicator of whether the input data structure is present (e.g., in the form of a void token). In this way, the second actor 303 can get fire its actions when the data structure is known to be available without having to waste processing resources associated with actually copying the data structure itself.

In another aspect of some but not necessarily all embodiments consistent with the invention, the analyzer 305 also ascertains when it is safe to merge any modified members into the original data structure. Once updated, the modified data are not required to be sent.

In carrying out the various data passing strategies described above, it is noted that the references do not provide access to another actor's state, but to a value of a particular (structural) data type. This means that when a first actor has produced a reference as an output, any following mutation of that actor's state will not affect the value accessed via the reference, as read by a second actor (the consumer). With respect to an actor's state, the references behave like tokens of scalar type and like that case, the structure of the reference is "copied" from producer to the consumer.

The herein-described data passing strategies should be implemented in processing environments in which there is a reasonable way of realizing access via the reference (as discussed above). Given certain decisions about the deployment of the dataflow program, the use of references may be inefficient or even infeasible.

Also, apart from a special case that is described below, the use of references is applied to references to non-mutable (read only) structures. This is why modified members have to be treated separately from the reference. This aspect is important because it allows an actor to produce the same reference on multiple connections, possibly to multiple consumers. Also, a consumer can forward a reference received on an input port to an output port, possibly with the addition of modified members, as described earlier (i.e., sending a reference and a collection of updated, live members to a consumer).

A common pattern is that several consumers are connected to a single output port of a producer; in this way receiving identical streams of input tokens. If those consumers were allowed to modify the structure via the references, many complications would arise: synchronization would be required and timing-dependent behavior would arise on a multi-threaded system.

Still another aspect involves a special case in which the structure may be mutated via the reference ("merge modified members into the original data structure"). What the "analyzer" needs to "ascertain" is that there is no uncertainty as to the ordering of reads and writes to the modified member, in any actor. Specifically, any access (read or write) to the member that may appear before (after) the modification must always appear before (after) the modification.

It is also recognized that the analyzer 305 can detect mixed situations that do not fall exclusively within any of the examples described with respect to FIGS. 3A through 3E. For example, it may be the case that the first actor 301 modifies only some but not all members of a data structure. As described with respect to FIG. 3C, this could result in only the modified members being copied to the second actor 305. However, it may also be true that the second actor 303 does not use one or more of these modified members. Thus, as described in connection with FIG. 3B, the analyzer 305 would inhibit copying of even the modified members that are not used by the second actor 303.

To take another mixed case example, suppose that the first actor 301 modifies some (FIG. 3C) or even all (FIG. 3A) members of the data structure, but that the second actor 303 merely needs to know when a data structure is present without needing to know the actual values of any of its members (FIG. 3E). In this instance the analyzer 305 recognizes that the most efficient data handling procedure is that which was described in connection with FIG. 3E; that is, to pass only information that is indicative of the presence of input data.

The described mixed case examples are not intended to be exhaustive, but merely to illustrate principles that govern decision making in the context of embodiments that are consistent with the invention. In each case, the analyzer 305 seeks to cause the consumer actor to receive only a minimal amount of information required for the actor to fire.

Figure 4:
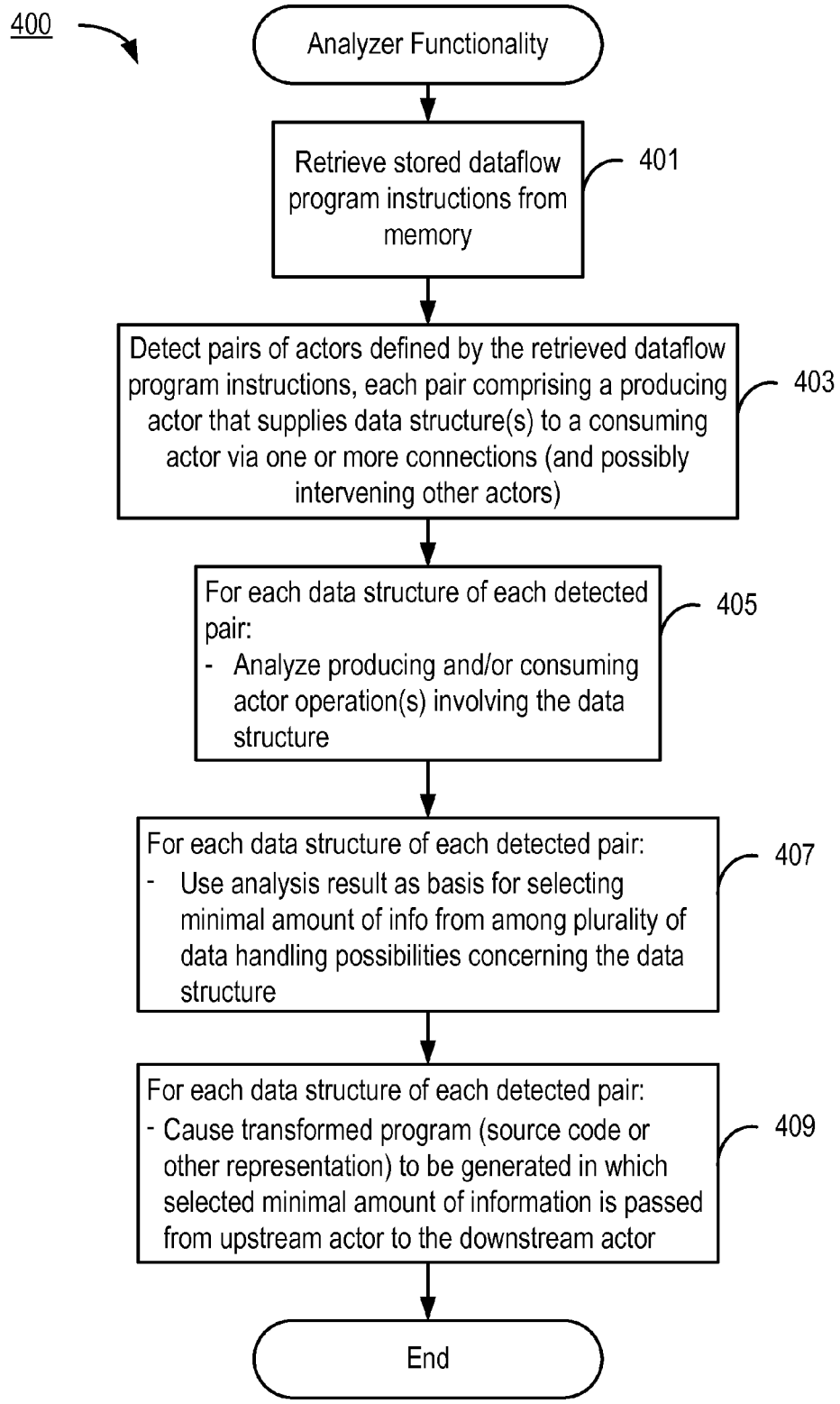
FIG. 4 is, in one respect, a flow chart of steps/processes performed by an analyzer in accordance with some but not necessarily all exemplary embodiments of the invention.

To further illustrate aspects of embodiments consistent with exemplary embodiments of the invention, FIG. 4 is, in one respect, a flow chart of steps/processes performed by an analyzer in accordance with some but not necessarily all exemplary embodiments of the invention. In another respect, FIG. 4 can be considered to depict exemplary means 400 comprising the various illustrated circuitry (e.g., hard-wired and/or suitably programmed processor) configured to perform the described functions.

In this exemplary embodiment, it is assumed at the outset that the data flow program to be analyzed is stored in a non-transitory processor-readable storage medium. Accordingly, an initial step includes retrieving stored dataflow program instructions from a memory (step 401).

The analyzer detects one or more pairs of actors defined by the retrieved dataflow program instructions (step 403), wherein each detected pair of actors comprises a producer actor and a consumer actor, wherein the producer actor supplies a data structure to the consumer actor.

The analysis includes, for each data structure of each detected pair, analyzing one or more operations of the producer actor that involve the data structure and/or analyzing one or more operations of the consumer actor that involve the data structure (step 405). The "and/or" in the previous step is in recognition of the fact that, in some embodiments, it may be sufficient for the analyzer to ascertain that the producer actor does not modify the data structure, in which case it may be sufficient to merely pass a reference to the consumer actor without analyzing that consumer actor's actions or, in some instances, to pass to the consumer actor the same minimal information that the producer actor received on its input ports (e.g., the producer actor may have received only modified members of a data structure and a reference to the original data structure, and this same minimal information can be passed on to the consumer actor if the producer actor does not make any modifications to the data structure). Alternatively, or in addition, it may be sufficient for the analyzer to ascertain that the consumer actor triggers its actions based merely on the presence of the data structure without needing the actual data values of any of the data structure's members. In this latter case, it may be sufficient merely to pass an indicator that data is present without analyzing the producer actor's actions directed toward the data structure.

Next, for each data structure of each detected pair, the result of the analysis is used as a basis for selecting a minimal amount of information from among a plurality of data handling possibilities concerning the data structure (step 407). As explained earlier, the plurality of data handling possibilities concerning the data structure can include, without limitation:

1. a subset of input data structure members consisting of fewer than all of the input data structure members;
2. a combination of a subset of data structure members consisting of fewer than all of the data structure members and a reference to remaining data structure members that are not in the subset of data structure members;
3. a reference to the data structure; and
4. an indicator of data structure presence that does not include any data structure values (e.g., a void token).

It can be observed that data handling possibility "3" (i.e., sending only a reference to the data structure) is a special case of data handling possibility "2" (i.e., sending a combination of a subset of data structure members consisting of fewer than all of the data structure members and a reference to remaining data structure members that are not in the subset of data structure members) that is useful when none of the live members has been updated. It can also be observed that data handling possibility "4" (i.e., sending an indicator of data structure presence that does not include any data structure values (e.g., a void token)) is a special case of data handling possibility "1") (i.e., sending a subset of input data structure members consisting of fewer than all of the input data structure members) that is useful when no member is "live".

Finally, for each data structure of each detected pair, program code is generated, for use as at least part of a transformed program, wherein the generated program code causes the selected minimal amount of information to be passed from the producer actor to the consumer actor.

Further aspects and considerations relating to various embodiments consistent with the invention are presented in the following discussion.

As explained above, the various embodiments address the problem of excessive copying of data structures when these data structures are to be transported between actors of a dataflow program. The problem arises when an actor consumes input and produces output in the form of data structures ("structural tokens"). Conventional techniques for implementing executable dataflow programs (e.g., interpreters, compilers, assemblers, etc.) may require considerable bandwidth in order to implement the connections between the actors.

The various embodiments consider the case in which an actor produces a structural token that is identical (or nearly identical) to one that is consumed at an input port of that actor. On refers to a "transfer" of a structural token from an input connection to an output connection in such cases. The various embodiments that are consistent with the invention involve transforming a dataflow program into an equivalent form (in terms of the result that is computed) that requires less bandwidth to implement the transport of structural tokens over the connections. The transformed dataflow program is herein referred to as a "transformed program."

Techniques that are employed to achieve lower structural token transfer bandwidth requirements include:

Limiting the transport of the structure members (henceforth called "members") to those that are used (i.e., the "live members") in the consumer actor and/or, via one or several transfers of the structural token, in a consumer further downstream.

Transporting a reference to the structural token rather than the structural token itself. This approach is complicated by allowing modification (changing the value of one or several members) when transferring the consumed token to an output connection. One of the described solutions involves transporting modified members alongside a reference to the original structural token.

The following sections describe:

analysis of live members in the context of connections of a dataflow program and how this relates to live variable analysis how structural tokens are represented using references and how the modified members with respect to a reference are determined, and how modified members, in certain situations, can be committed to a structural token that is represented using a reference.

Embodiments are described, in which the various technological aspects are achieved:

as a source-to-source transformation,
as part of a compiler for a dataflow language,
relying on analysis of live members ("downstream"—defined in the next section) only
relying on references and analysis of modified members ("upstream"—defined in the next section) only
by combining references, and analysis of both live and modified members.
while adding reference creation points iteratively when there is a connection that transports a large number of modified members alongside the reference.

Detecting Live Members

The analysis and transformation of a dataflow program is now illustrated, which is made possible by considering the usage of members in a structure that is produced on some connection between a pair of actors. Usage analysis is applied to the consumer actor on the connection. It will further be shown how the analysis relates to live variable analysis.

The purpose of the analysis is to identify the members that might be used by the consumer actor and/or by any other actor that might receive the member from the producer actor with the consumer actor performing as an intermediary node in the transfer. The identified members are called the set of "live members". Whether transferred members of a data structure on a connection are live or dead is a property of the connection. The goal is to transfer only members that are live (i.e., those that might be used in the downstream in some execution of the dataflow program). As used herein, the term "downstream" refers to the direction from a producer to a consumer with the possibility of there being intermediate nodes in between the producer and consumer. The term "upstream" conversely refers to the direction from a consumer to a producer, also with the possibility of there existing intermediate nodes in between the consumer and producer.

It may be the case that all members are live (over a connection), in which case the entire structure is copied over the connection. On the other end of the spectrum of possible solutions, none of the members is live, in which case it is most efficient to merely transfer a "void" token (i.e., a token without value, but whose presence can be detected).

Figure 5:
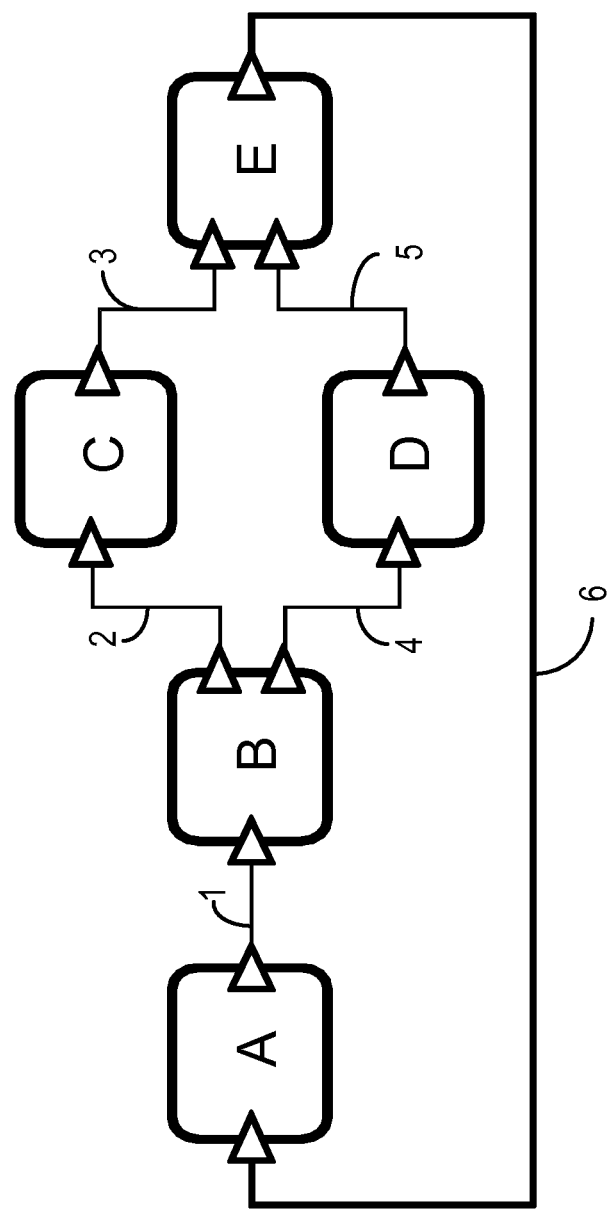
FIG. 5 illustrates a dataflow graph of a dataflow program that will be used to illustrate various aspects of embodiments consistent with the invention.

FIG. 5 illustrates a dataflow graph of a dataflow program that will be used to illustrate various aspects of embodiments consistent with the invention. This exemplary dataflow graph consists of five actors and six connections. The six connections are labeled "1", "2", "3", "4", "5", and "6". Also, for the sake of convenience, the five actors are labeled A through E. It is here noted that the actors illustrated in FIG. 1 also include actors labeled A through E. However, this labeling is not intended to convey to the reader that actor A of FIG. 1 is the same as actor A of FIG. 5; that actor B of FIG. 1 is the same as actor B of FIG. 5; that actor C of FIG. 1 is the same as actor C of FIG. 5; that actor D of FIG. 1 is the same as actor D of FIG. 5; or that actor E of FIG. 1 is the same as actor E of FIG. 5. To the contrary, while in some instances an actor depicted in FIG. 1 could perform the same function as an actor depicted in FIG. 5, in general this is not the case.

The property that characterizes a member as "live" relates to the existence of paths from a first actor, which produces a token of structural type, via at least one connection, to a second actor, which consumes such a token and uses (reads) the value of a member that was produced by the first actor. In addition to the endpoints of such a path, the first (producing) actor and the second (consuming) actor, a path may consist of any number of intermediate actors that consume the structure, possibly modify it and produce the (modified) structure as output. Provided that none of the intermediate actors assigns a new value to a given member that is used by the second actor, the first (producing) actor needs to provide the value of that member. In this case the given member is live on all connections on the path between the first and second actors.

Actor Behavior of the Example of FIG. 5

To illustrate various aspects with a concrete example, assume that all of the connections 1 through 6 in the data graph of FIG. 5 transport tokens of the structural type, s, as shown in FIG. 2.

Further, assume that actor A has three actions, each specifying a possible firing of the actor:

a first action that produces one token to connection 1;
a second action that consumes a token from connection 6, modifies member s.a and produces the modified structure to connection 1; and
a third action that consumes a token from connection 6 and uses (reads) the members s.a and s.d, but does not produce any output.

Actor A (and actors in general) may fire according to any of its actions, and the choice is based on the availability of input, the value of received tokens and/or the local state of the actor. The conditions governing the selection of action are sometimes referred to as "firing rules" (see, e.g., page 778 of E. A. Lee, T. M. Parks, "Dataflow Process Networks", Proc. IEEE 83:5 (May 1995). In particular, action selection may thus be based on the value of input tokens of structural types, in which case one or several members are used by the actor. Such usage is attributed to the actions, whose selection depends on a condition that involves the member.

Each action that consumes a structural token may also use (read) the members of the structure for the purposes of computing the outputs, which are produced by the action, and to update the local state of the actor.

It is known in the art of program analysis how to determine properties such as the set of used and defined variables from source code. This is a necessary first step of live variable analysis. The interested reader can refer to pages 631-632 of Aho, Sethi, Ullman, *Compilers—Principles, Techniques and Tools*, Addison-Wesley, (1986) (hereinafter "Aho et al.") for more information in this respect. The inventors of the subject matter described herein have recognized that the tools used in program analysis can be applied as well to dataflow programs because the source code of a dataflow program explicitly specifies subdivision into actions and the token consumption/production of each action.

Connection/Transfer Graph

One way of reasoning about live members in a dataflow program is to represent the behavior of the dataflow program by a more detailed representation than is shown in FIG. 5. Accordingly, a directed graph, herein referred to as a "Connection/Transfer graph" is used, which makes transfers of (possibly modified) structural tokens explicit. This depiction allows an analogy with conventional live variable analysis to be made.

Figure 6:
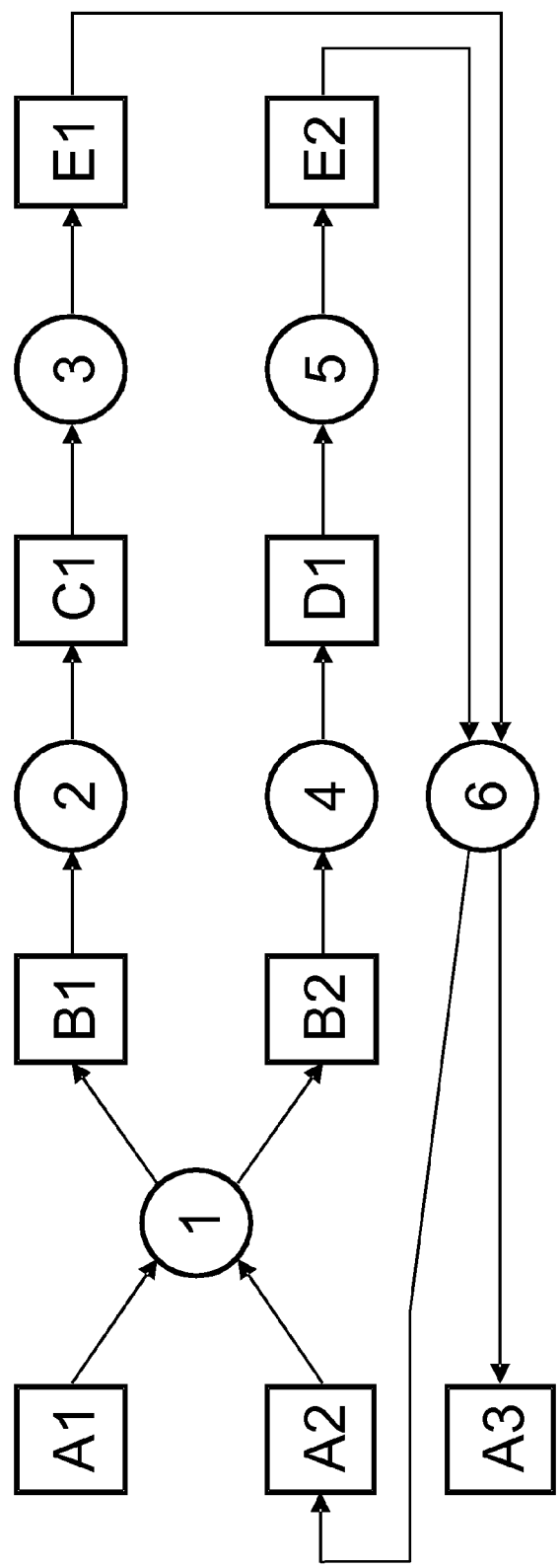
FIG. 6 shows an example of a Connection/Transfer graph that is based on the dataflow program depicted in FIG. 5.

FIG. 6 shows an example of a Connection/Transfer graph that is based on the dataflow program depicted in FIG. 5. In such a graph, vertices depicted as circles (referred to herein as "connection vertices") represent connections and vertices depicted as boxes (referred to herein as "transfer vertices") represent the transfers of structural tokens between connections. The Connection/Transfer graph is bipartite, meaning that each directed edge goes from a "circle" to a "box" or vice versa. Further, each transfer has at most one predecessor, namely the connection from which a structural token is consumed.

The boxes depicted in FIG. 6 correspond to transferring actions of the actors depicted in FIG. 5. In particular in this example, the transfer vertices A1, A2, and A3 represent the defined actions of actor A; the transfer vertices B1 and B2 represent the defined actions of actor B; the transfer vertex C1 represents the defined action of actor C; the vertex D1 represents the defined action of actor D; and the vertices E1 and E2 represent the defined actions of actor E. A transfer such as the transfer vertex A1, which has no predecessor, is referred to as a "source vertex" in that it is a source of a structural token. The successor of a transfer represents a connection to which a token is produced. A transfer such as the transfer vertex A3, which has no successor, is referred to as a "sink vertex" in that it is a sink of a structural token. A transfer vertex, such as the transfer vertex A2 which has both a predecessor and one or more successors, signifies the consumption of a structural token from one connection (the predecessor) and the production of a possibly modified instance of the structural token to one of several connections (the successors).

In the example of FIG. 6, the actions of the five actors correspond directly to the nine depicted transfers (A1, A2, A3, B1, B2, C1, D1, E1, E2). However, this need not always be the case. In general, dataflow programs can define actions that neither consume nor produce structural tokens, thus not corresponding to any transfer. Such actions would, therefore not be depicted in a Connection/Transfer graph. Further, there may be actions that consume several structural tokens, in which case multiple transfers correspond to a single action (there is one transfer vertex per structural token consumed). An action may also produce several structural tokens, which are unrelated to any consumed structural token (i.e., structure tokens that are not the result of modifying an input), in which case the action corresponds to one or several transfers that are sources of the structural tokens: there is one source per distinct structure created. So whereas each transfer corresponds to a specific action, an action may correspond to zero, one or several transfer vertices.

Each edge is associated with a positive integer, called the "multiplicity" of the edge. An edge (t,c) from a transfer vertex, t, to a connection vertex, c, corresponds to the production of structural tokens. A transfer may produce multiple copies of a structural token to a single connection, which is indicated by a multiplicity greater than one (i.e., a multiplicity corresponding to the number of copies). An edge (c,t) from a connection vertex to a transfer vertex always has a multiplicity equal to one (i.e., representing the consumption of a single token). Edge multiplicity is of importance in the context of references to structural tokens, which is discussed below.

It is assumed that the endpoints (the producer and consumer actors) of a connection agree on the type of tokens passed over the connection. This implies that a particular structural type can be associated with each connection and with each transfer vertex. Further, an edge between a connection vertex and a transfer vertex implies that the same type is associated with both of them.

It is noted that a Connection/Transfer graph is not necessarily connected. Each connected component corresponds to an analysis problem, pertaining to a particular structural type, which is independent of those of possible other connected components. This means that each connected component can be analyzed separately. In the following discussion, it is assumed that a single connected component (thus associated with a single structural type) is being considered.

Live Members Analysis

Figure 7:
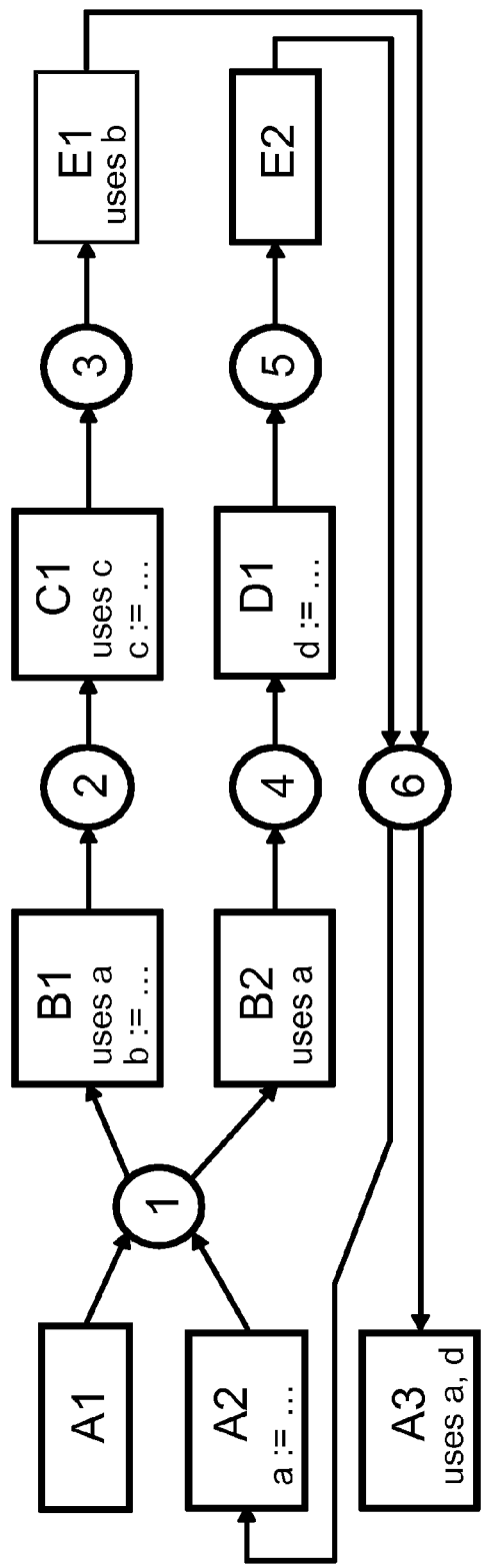
FIG. 7 is a modified depiction of the Connection/Transfer graph of FIG. 6 in which the "transfer vertices" are annotated with their effect as specified by this exemplary dataflow program.

FIG. 7 is a modified depiction of the Connection/Transfer graph of FIG. 6 in which the "transfer vertices" (boxes) are annotated with their effect (i.e., their creation, usage, and modification of members) as specified by this exemplary dataflow program. In this way, the token-related behavior of each actor is summarized and more readily analyzed.

It can be seen that Actor A has three actions (A1, A2, and A3). Action A1 produces a structural token, action A3 consumes a structural token, and action A2 consumes a structural token and also produces the same token as output after modifying one of its members, s.a.

It can also be seen that Actor B has two actions (B1 and B2), both of which consume a token from connection 1 and use the member s.a. Action B1 additionally modifies the member s.b and produces the modified input to connection 2. Action B2 instead produces the unmodified input to connection 4.

Actor C has a single action (C1), which consumes a token from connection 2, and uses the value of s.c before modifying the same member (i.e., s.c) and producing the modified structure to connection 3.

Actor D also has a single action (D1), which consumes a token from connection 4, modifies the member s.d and produces the modified structure to connection 5.

Actor E has two actions, the first of which (E1) consumes a token from connection 3, uses the member s.b and produces the unmodified structure as output to connection 6. The second action (E2) consumes a token from connection 5 and produces the unmodified structure as output to connection 6.

From this specification, it is clear that the member s.a is live at connection 1: A and B are the producer and consumer, respectively, of connection 1 and B uses s a Likewise, the path A, B, C over connections 1 and 2 (thus involving action B1 of actor B) is evidence that s.c is live at connection 1 (i.e., because action C1 uses s.c, which it obtains from connection 1). In contrast, it can be seen that there is no path such that the value of s.b, produced by actor A, is used. There does exist a path from A to E, and E does use s.b, but closer examination shows that E never uses the value of s.b that is produced by actor A, but instead uses the modified value of s.b that is produced by B. It is noted that the dataflow graph of FIG. 5 does not have sufficient detail to perform this analysis and reach these conclusions.

Thus, using the information provided in the Connection/Transfer graph of FIG. 7, it can be concluded that:

s.a is used in the transition B1 and the path 1, B1, which does not pass any modification of s.a. The member s.a is thus live and needs to be transferred over connection 1.

s.b is only used in E1 and all paths from 1 to E1 contain B1, which defines s.b (without first using the value of s.b received from actor A). The member s.b is thus dead on connection 1 and need not be transferred over that connection.

The path 1, B1, 2, C1 shows that s.c is live and needs to be transferred over connection 1.

The path 1, B1, 2, C1, 3, E1, 6, A3 shows that s.d is live and needs to be transferred over connection 1.

In determining the set of members that are live over each connection, it is convenient to also consider the set of members that are live at the beginning of each transfer:

If a transfer may use a member (before any assignment of that member), the member is live at the beginning of the transfer.

If a transfer (always) defines a member before any use of that member, the member is dead (not live) at the beginning of the transfer.

Otherwise (if neither of the above applies) a transfer, t, neither uses a particular member nor (necessarily) defines it; then the member is live precisely when it is live over at least one of the successors (connections) of the transfer.

Similarly, a member is live over a connection precisely when it is live at the beginning of at least one of its successors (transfers).

Formulated in this manner, the inventors have arrived at a way of stating the problem that has been reduced to the problem of live variable analysis, which is known in the art of program analysis. For more information, the interested reader can refer to pages 632-633 of Aho et al., which was cited earlier.

In making this analogy to live variable analysis, it is noted that

The Connection/Transfer graph corresponds to the program control-flow graph used in live variable analysis.

The vertices (connections and transfers) correspond to "basic blocks" (blocks of straight-line code, in which flow of control enters at the beginning and leaves at the end).

The edges of the Connection/Transfer graph correspond to production and consumption of tokens to/from a connection, whereas the edges of a program control-flow graph denote alternate paths of control flow. Similar to flow-of-control, the edges incident with a Connection signify alternate producers and consumers (each token is produced and consumed by one action/transfer) whereas the existence of multiple successors of a Transfer signifies simultaneous production (of identical tokens) to all of the successors (Connections).

The members of the structural type correspond to the variables of the program.

The effect of a transfer (in terms of used and defined members) corresponds to the effect of a basic block (in terms of used and defined variables). Since a connection neither render a member live or dead (in itself), it corresponds to an empty basic block.

The inventors of the subject matter described herein have recognized that what makes these two problems identical is that they consist in determining the existence of paths from each vertex of the graph to a use of a member/variable.

Figure 8A:
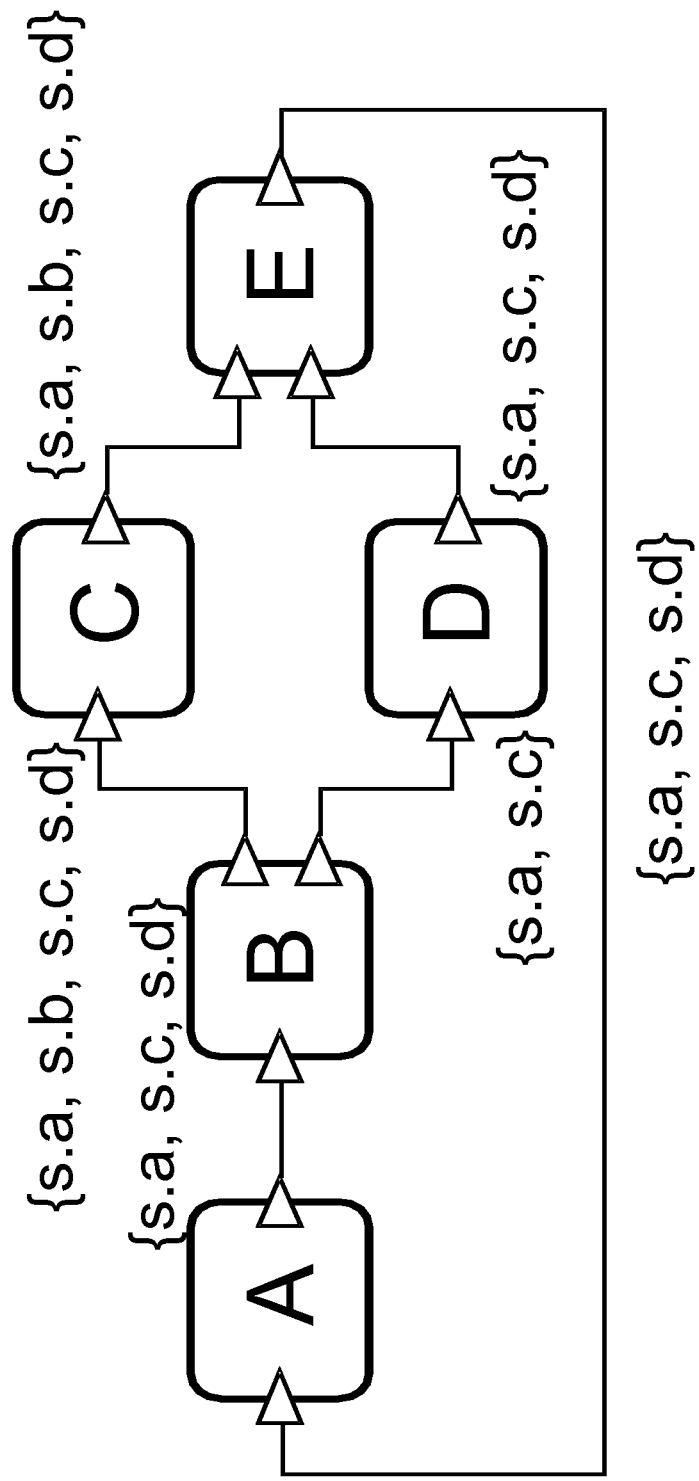
FIGS. 8a and 8b show the result of an exemplary analysis in accordance with aspects of embodiments consistent with the invention.
Figure 8B:
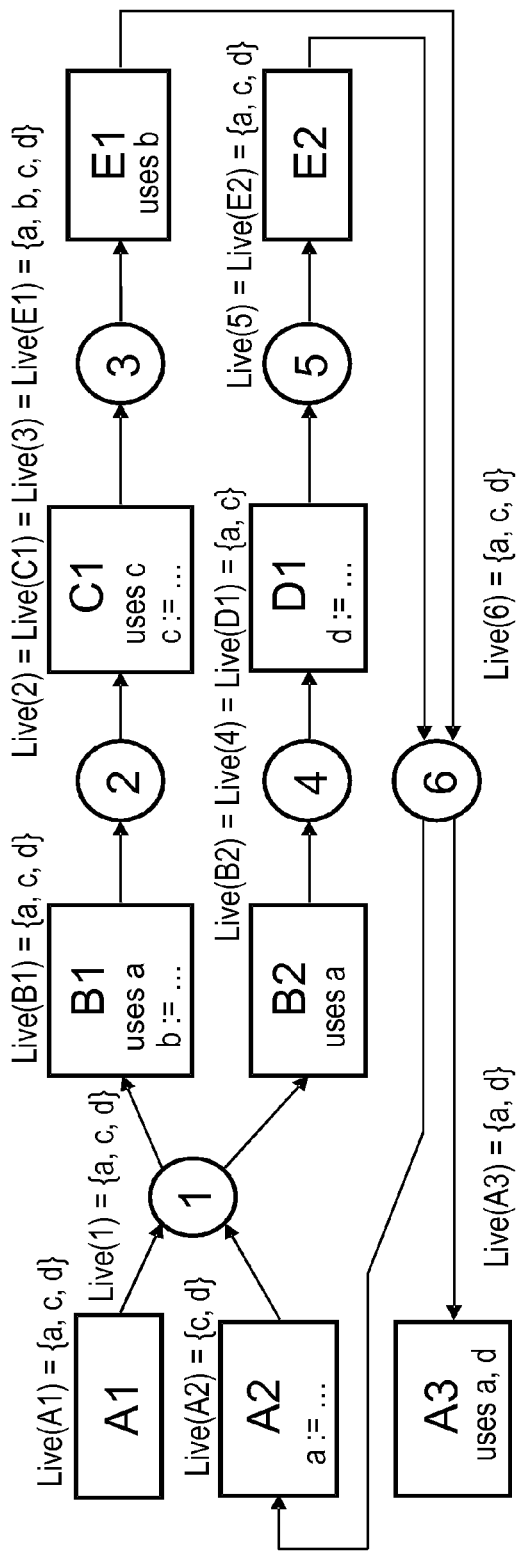

FIGS. 8a and 8b show the result of the analysis, the sets of live members over each connection, and the live members at the beginning of each transfer. The live variables problem is commonly formulated as iteratively finding the greatest fix point of a system of equations, involving Boolean vectors.

It can be seen that:
Live(1)={a, c, d} (no need to transfer s.b over connection 1)
Live(2)=Live(3)={a, b, c, d} (all members needed)
Live(4)={a, c} (no need to transfer s.b, s.d over connection 4)
Live(5)=Live(6)={a, c, d} (no need to transfer s.b over connections 5 and 6)

Figure 9A:
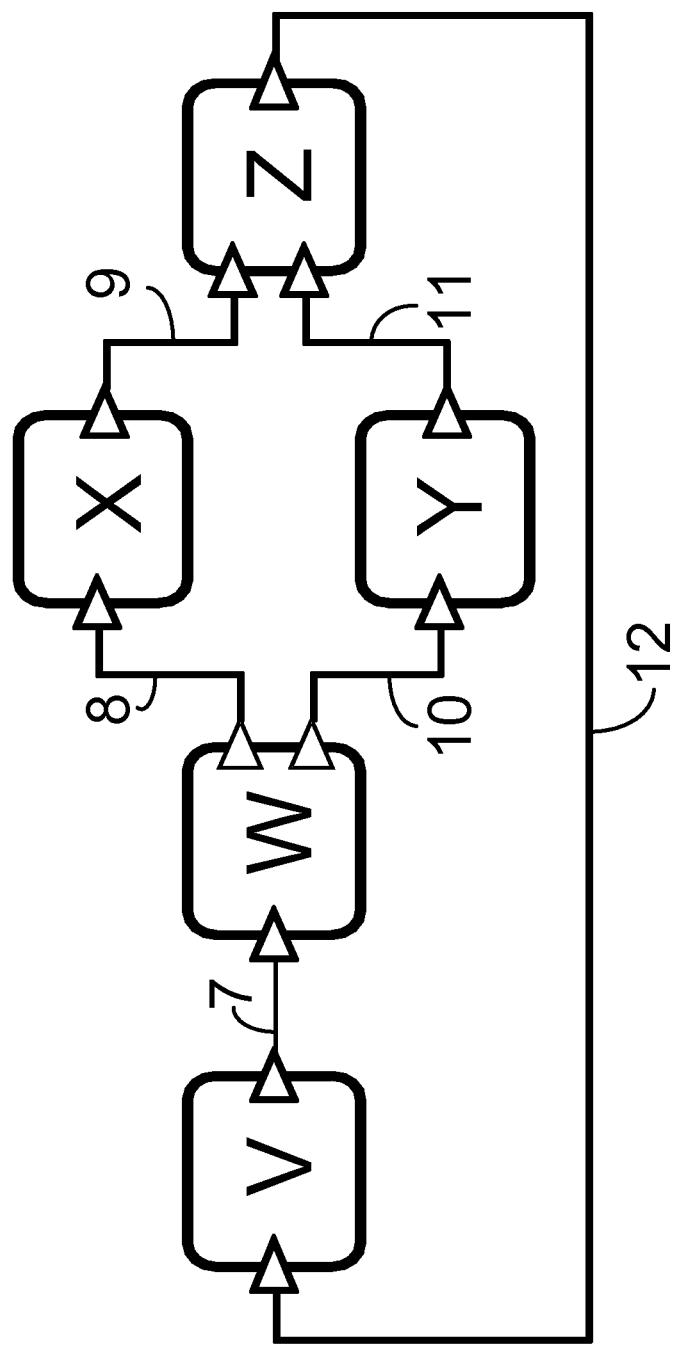
FIGS. 9a and 9b together depict an alternative example having a dataflow graph that is isomorphic to the one in FIG. 5, but in which the actions differ.
Figure 9B:
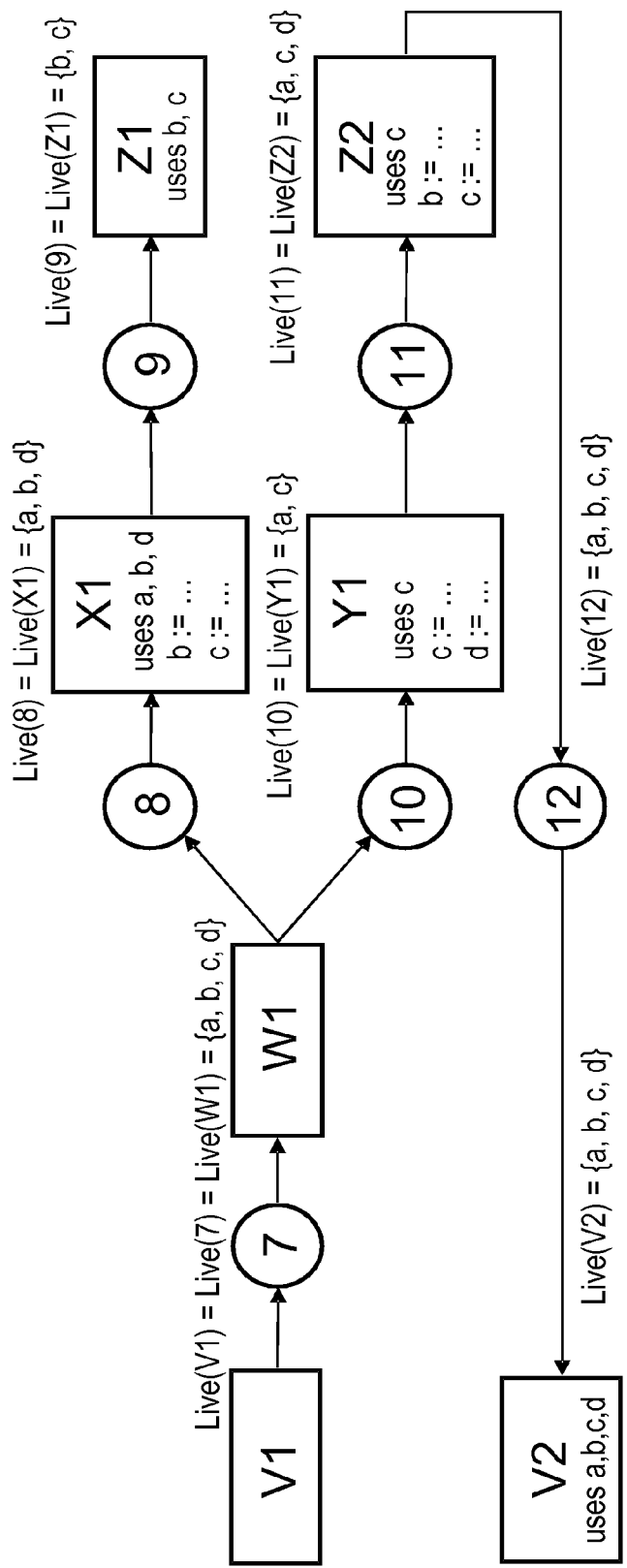

FIGS. 9a and 9b together depict an alternative example having a dataflow graph that is isomorphic to the one in FIG. 5, but in which the actions differ. The resulting Connection/Transfer graph is different, as is the solution to the live members problem. Particularly note that W1 has two successors (a transfer that produces identical tokens on two connections). Similarly, Z1 and Z2 are intended to illustrate that a single action in Z, which consumes two structural tokens (one from connection 9 and one from connection 11), results in two transfer vertices. Also note that the feedback (cycle) in the dataflow graph is not reflected by a cycle in the Connection/Transfer graph: no token is transferred from connection 12 to connection 7.

An Exemplary Embodiment Based on Source-to-Source Transformation

A structure is an aggregation of a collection of members. A connection of structural type can thus be decomposed into an aggregation of connections, corresponding to the members of the structure. Additionally, limiting the number of connections in the resulting aggregation, corresponding to the live members over the connection, limits the bandwidth that is transferred over the connection. This can be viewed as creating a restriction of the structural type to the set of live members.

The transformation involves generating the source code of a new actor corresponding to an original actor, which is either the consumer or producer of a decomposed connection. The source code of the new actor is largely a verbatim copy of the source code of the original actor. However, the following modifications are made in the copying process:

Each action that (in the original source code) consumes a structural token from a decomposed connection, is modified such that it instead consumes each of the live members from its corresponding, new, connection.

Each action that (in the original source code) produces a structural token from a decomposed connection (i.e., a production onto one connection), is modified such that it instead produces each of the live members onto its corresponding, new, connection(s).

It is noted that the transformed source code is intended as the input to a compiler, interpreter, or similar development tool. Further development and maintenance of the source code is intended to be performed using the original source code.

An Embodiment Based on Integration in a Development Tool

Alternatively, means for transforming the source code into a modified intermediate (or lower level) representation of the source code can be incorporated into a compiler, interpreter or similar development tool, in which case it is not necessary to generate transformed source code. It would be clear to someone skilled in the art, based on the foregoing discussion, that the corresponding transformation can instead be performed at the level of an intermediate representation of the dataflow program, which is internal to such a development tool. The transformation is performed at the level of a dataflow program that defines abstractions in terms of actors, actions, connections, tokens (including structural tokens), and the like. A compiler typically performs translation from source code to target code in several steps (usually called "phases"). This gives rise to one or several intermediate representations of the program. The transformation is applicable to any representation of the program that exposes the relevant abstractions (e.g., actors, actions, connections, structural tokens) and allows the substitution of connections.

Using a Reference to a Structural Token References

By a "reference" to a structural token is herein meant an abstract data type that allows the value of individual members to be retrieved. Possible implementations include (but are not limited to):

A pointer to a structure in a memory address space that is shared by producing and consumer actors.

An address to a structure in a remote address space, along with an operation that implements the retrieval of a given member in the remote address space.

In general, a reference comprises an operation that performs retrieval of a member and the parameters necessary to perform that operation.

It is noted that a reference implements an immutable object, a structure whose members cannot be changed after the construction of the reference. Construction of a reference entails creating a new instance of the structure.

Transferring a reference to a structure over a connection may require less bandwidth than transferring the structure itself. This benefit is pronounced when:
1. the reference is implemented using a data type that is considerably smaller (requires less bandwidth) than the total size of structure members that need to be transferred (all members or live members only),
2. the structure is transferred over several connections (which, in a conventional implementation, would require replicating the structure, once for each connection),
3. a relatively limited collection of members are actually used (read) in the consumer, or
4. a relatively limited collection of members are modified.

Items (1) and (2) relate to the reduction of bandwidth that is possible by copying the reference between connections rather than copying all the relevant (live) members of the structure.

Relating to (3) it is noted that reading members via the reference also requires bandwidth. If all or nearly all members are (always) read via the reference in each of the actors that consumes the reference, the bandwidth is not reduced.

Item (4) relates to members that are modified on the path from the producer that constructed the reference to a consumer. It is noted that such a modified member cannot be retrieved via the reference. Instead these members need to be passed along with the reference. Given a large collection of transmitted modified members, the bandwidth is not reduced and it may be beneficial to instead pass all the (live) members of the structure and no reference.

It is possible to let each action that produces a structural token construct a new reference. On the one hand, this takes away the need for transmitting modified members (changes can be incorporated into the new reference). On the other hand, all the unmodified members must be read (via a reference) to construct the new reference (which requires bandwidth, as described above). The choice of where (in which action) to construct references thus affects the overall benefit of the approach.

In an embodiment that combines "upstream" and "downstream" analysis, the benefit of using a reference should be compared to the alternative of copying live members only (which may or may not include all members of the given structure). Further, the knowledge of which members are live at each connection allows the collection of modified members to be reduced to those that are also live. The use of references is then beneficial to the alternative of copying live members when the set of live and modified members is limited compared to the set of live members. A case in which the use of references is particularly beneficial is thus when the total size of the live members is large (compared to the size of the reference), each actor reads a limited collection of the members and no members are modified.

Analysis of Modified Members

The following analysis identifies connections over which a structural token can be represented using a reference, and the collection of modified members necessary to pass along with the reference. It is assumed that the points at which references are constructed are known beforehand. Further, when a reference is constructed, it is assumed to incorporate any modified member in the new reference (so that it is possible to transfer the reference alone, without requiring extra bandwidth for modified members).

The analysis has two parts:
determining the connections over which a structural token can be represented as a reference, and
determining, over each connection, the set of (potentially) modified members with respect to the point at which the reference was constructed.

The first part involves identifying connections, such that the producer actor (with respect to the connection) either constructs references itself or transfers references that are constructed further upstream. In terms of the Connection/Transfer graph, reference construction occurs at one or several transfer vertices, and the analysis involves determining the connection vertices, such that on every path from a source vertex to the given connection vertex, there exists a transfer vertex that, which constructs a reference. The role of the source vertex in the premise (i.e., "on all paths", etc.) is to force a consideration of sufficiently long paths, such that it starts at a source vertex. Otherwise an analysis might restrict its consideration to shorter paths that could erroneously lead to a conclusion that a given path cannot be implemented using references.

It is possible to use a single Boolean variable per connection to represent the property that a given connection can represent its structural tokens as references, which is the case when the connection itself allows for references (i.e., the deployment provides one or more mechanisms that enable a consumer actor to retrieve members via a reference) and all the predecessors (transfer vertices) of the connection can produce references.

A transfer vertex can produce a reference when:
it represents one of the given points, at which references are constructed, or
it is not a source vertex and its unique predecessor (connection vertex) can represent its tokens using references.

In this formulation, the problem consists of solving a system of Boolean equations. It would be readily understood by one or ordinary skill in the art that such a problem can be solved by iteratively finding the greatest fix point. The similarity with the formulation of the live members analysis is noted, but a couple differences can be pointed out:
The property of interest relates to paths ending at a given vertex, thus involving the "upstream". In contrast, live members analysis concerns paths starting at a given vertex, thus involving the "downstream".
The property of interest is asserted on all paths, and is thus a conjunction of the property of the predecessors. In contrast, live members analysis concerns the existence of a path (set union or disjunction of Boolean vectors).

Further, it is noted that the property of interest can be represented using a (scalar) Boolean variable per connection vertex, whereas a set of members or a Boolean vector represents the property in live members analysis.

The second part consists in, for each connection (over which tokens can be represented as references), identifying the members that may have been modified on some path from a transfer vertex to the given connection vertex, such that none of the vertices in the path creates a reference, except possibly for the first vertex of the path.

In this case, the property of interest is a set of members and each connection vertex is associated with such a set. The existence of a path ending at a given connection vertex is thus of interest, which means that the set of modified members over a connection is the union of the set of produced, modified members of the predecessors (transfer vertices) in the Connection/Transfer graph.

The effect of a transfer vertex (the set of produced, modified members) is modeled in the following way:

- If the transfer vertex is a sink, no structural token is produced and the effect of the vertex has no impact on the solution (such a vertex is not the predecessor of any connection vertex). It is thus safe to let the effect of the transfer vertex be undefined.
- If the transfer vertex represents one of the given points at which references are constructed, the set of produced modified members is empty (modified members are incorporated into the new reference).
- Otherwise, if it is not a source vertex, the set of produced modified members is the union of the corresponding set of the unique predecessor (connection vertex) and the set of members that are modified locally by the transfer vertex.
- Otherwise, it is a source vertex that does not construct a reference. By convention the set of produced modified members is the set of all members.

Note that in the latter (fourth) case, the existence of a path from such a source vertex to a connection vertex implies that a reference is not created on all paths, so the first part of the analysis determines that the connection cannot be implemented using a reference.

Again it is noted that, for someone skilled in the art, it is clear that this problem can be formulated as a system of equations involving sets of members (or equivalently Boolean vectors), and that a solution can be obtained by finding the greatest fix point iteratively.

Figure 10:
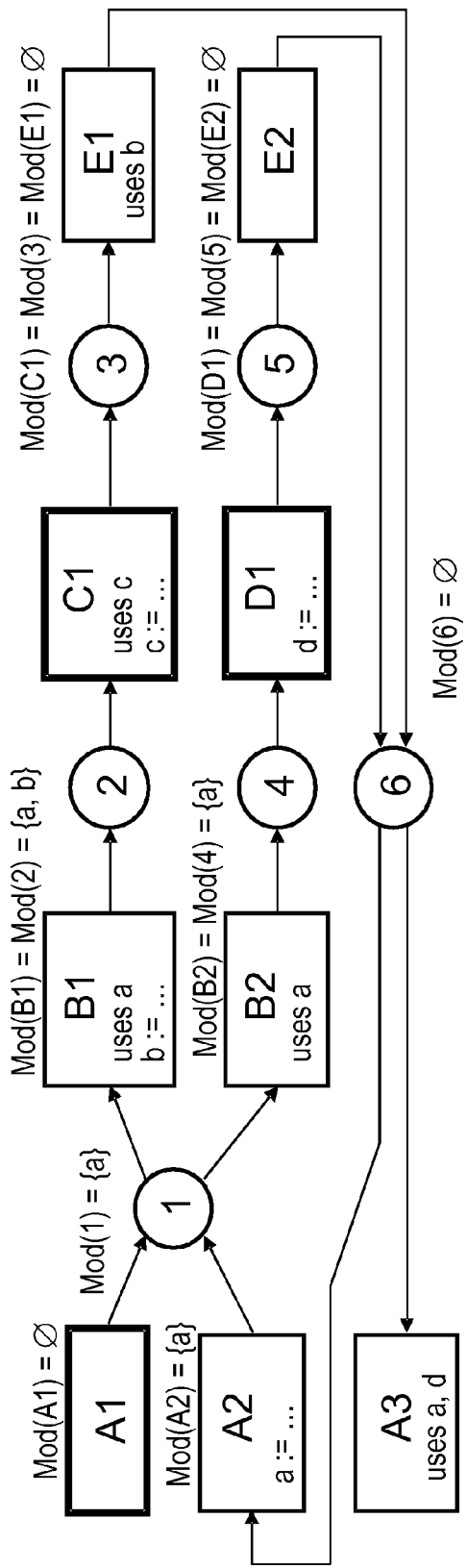
FIG. 10 illustrates aspects of the exemplary embodiments in the context of a concrete example, using the dataflow graph of FIG. 5 with the Connection/Transfer graph shown in FIG. 7.

FIG. 10 illustrates aspects of the above-described techniques by a concrete example, using the dataflow graph of FIG. 5 with the Connection/Transfer graph shown in FIG. 7. Additionally it is assumed that references are constructed in vertices A1, C1 and D1.

First it is noted that all connections can be implemented using references. Since the only source vertex, A1, is among the vertices that constructs references, every path from a source vertex to any of the connections contains the construction of a reference.

For the second part of the analysis, let Mod(c) denote the analysis result, the set of modified members over connection c. It is shown that:
- $Mod(1) = \{a\}$ (s.a needs to be transferred over connection 1 in addition to a reference)
- $Mod(2) = \{a, b\}$ (s.a and s.b need to be transferred over connection 2 in addition to a reference)
- $Mod(3) = \emptyset$ (no modified members over connection 3 because C1 generates a new reference to the updated version of s)
- $Mod(4) = \{a\}$ (s.a needs to be transferred over connection 4 in addition to a reference)
- $Mod(5) = Mod(6) = \emptyset$ (no modified members over connections 5 and 6)

Figure 11:
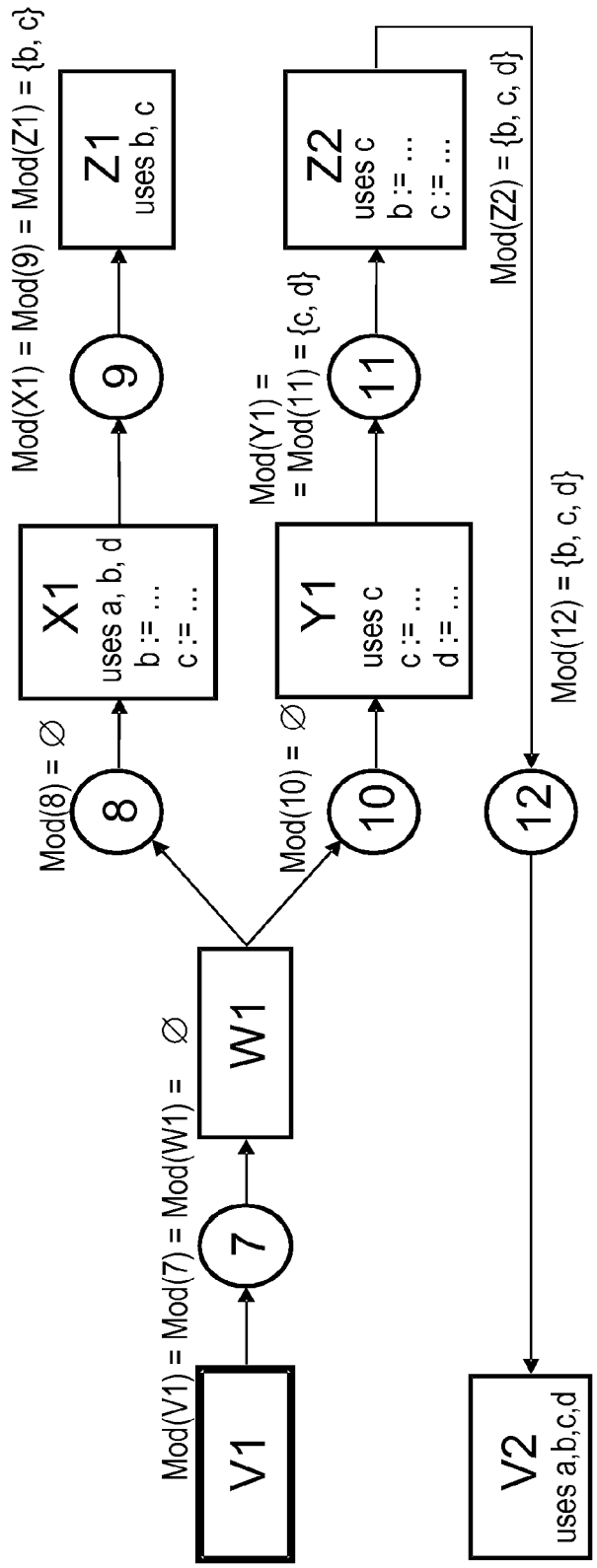
FIG. 11 illustrates aspects of the exemplary embodiments in the context of a second example, corresponding to the dataflow graph and the Connection/Transfer graph shown in FIGS. 9a and 9b.

FIG. 11 shows a second example, corresponding to the dataflow graph and the Connection/Transfer graph shown in FIGS. 9a and 9b. Here it is assumed that references are constructed in vertex V1. It is shown that:
- $Mod(7) = \emptyset$ (no modified members over connection 7 because V1 generates a new reference to the updated version of s)
- $Mod(8) = Mod(10) = \emptyset$ (no modified members over connections 8 and 10 because W1 does not modify any members of s and receives only a reference from connection 7.
- $Mod(9) = \{b, c\}$ (s.b and s.c need to be transferred over connection 9 in addition to a reference)
- $Mod(11) = \{c, d\}$ (s.c and s.d need to be transferred over connection 11 in addition to a reference)
- $Mod(12) = \{b, c, d\}$ (s.b, s.c and s.d need to be transferred over connection 12 in addition to a reference)

Constructing References at all Sources of Structural Tokens

In an embodiment, references are constructed by all actions that correspond to sources in the Connection/Transfer graph, and all structural tokens are represented as references with possible modified members transferred separately.

Given the points at which the references are constructed (i.e., the source vertices), the collection of modified members can be determined with the technique that is described above. The first part of analyzing the modified members becomes trivial (every connection of structural type represents its tokens using references): a transfer vertex that is a source constructs a reference itself and a non-source vertex consumes structural tokens from its (unique) input connection.

Combined Analysis of the "Upstream" and the "Downstream"

By combining live member analysis and modified members it is possible to limit the transfer of modified members to only those members that may be used in the "downstream" (i.e., those members that are "live"). The two analysis problems are independent. Combining the two solutions simply consists of forming the intersection of live and modified members, $Live(c) \cap Mod(c)$, over each connection, c.

Adding Reference Construction Points Iteratively

Another aspect of some but not necessarily all embodiments involves detecting the case in which the benefit of using references is diminished by a large number of modified members. If there is a connection, c, such that the total size of the members in Mod(c) is above some threshold, the predecessors of c (which are transfer vertices) are added to the set of reference constructed, after which the second step of the modified member analysis is repeated.

In more detail:
1. Initially let R, the set of transfer vertices that construct references, contain the source vertices only.
2. Determine Mod(c), the set of modified members, for every connection c, given R.
3. If there is a connection, c, such that the total size of the members in Mod(c) is above a (positive) threshold, T, then add the transfer vertices, which are predecessors of c, to the set of reference construction points, R, and repeat from (2).
4. Otherwise use the sets R and Mod(c) to transform the dataflow program.

Notice that in (3), the inclusion of the predecessors in R causes Mod(c) to become the empty set (size of modified members is zero) in the next (and any further) iteration of the algorithm. In particular, this means that the number of iterations is bounded by the number of connection vertices of the Connection/Transfer graph.

A useful (but not essential) value for the threshold, T, is half the size of the structural token (half the total size of all members).

Updating Structural Tokens Via References

This section describes some specific cases, in which it is possible to commit modified members to a structural token that is represented using a reference. It is first noted that the concept of a reference to an immutable object does not allow for updates. This limitation has great significance, since race conditions (erroneous timing-dependent behavior), which could otherwise be caused by a parallel execution of various actors/actions of a dataflow program, are avoided.

Given that the actor firing, which consumes the token, can be guaranteed exclusive access to the token, no race condition would be caused by updating members via the reference. Under the assumption that no other actor can simultaneously hold a reference to the token, any access via the reference is strictly ordered relative the firing with exclusive access; an access that may take place before (after) the firing with exclusive access always takes place before (after) the firing.

In order to support an aspect of some embodiments that allows the updating of members, a mutable reference abstract data type is required. In addition to the operations of the (immutable) reference, an operation that updates the value of a given member is required.

Exclusive Access to the Entire Token

Exclusive access to a token can be asserted trivially if no actor firing creates multiple references to the token. Specifically, when there is no transfer in the Connection/Transfer graph that has more than a single connection as a successor and none of the transfers produces more than a single instance of the reference to the token on a single connection (i.e., none of the transfers produces the token with a multiplicity greater than one).

In this case, the production of a token can be viewed as handing over the ownership of the reference to the consumer. It is particularly noted that the existence of multiple successors of a connection (in the Connection/Transfer graph) either corresponds to multiple actions within a single actor that are potential consumers of the token or to a single action that consumes multiple tokens from the connection (and thus corresponds to several transfer vertices). In both cases, the consumption of any instance of the token can be attributed to exactly one transfer vertex (there is no duplication of the reference).

In the example depicted in FIGS. 6 through 8a/8b, no transfer vertex has more than a single connection, which means that each consumer has exclusive access to a reference to the structure s. It is then sufficient to create the reference in transfer A1. The modifications in transfers A2, B1, C1 and D1 can be performed via the reference. It is thus sufficient to transmit the reference only on all connections (no need to transmit modified members). It is noted that both of the connections 1 and 6 have multiple successors, but as described above, each given token will be consumed by a particular transfer vertex (B1 or B2 in the case of connection 1, and A2 or A3 in the case of connection 6).

By contrast, FIGS. 9a and 9b show an example in which transfer vertex W1 has multiple successors (X1 and Y1), which indicates duplication of a reference. Updating the members s.b, s.c and s.d via the reference under these circumstances would generally lead to race conditions. Since neither successor can be guaranteed exclusive access without having to make multiple copies of the token, it is reasonable to proceed as explained earlier, foregoing modification of the token and instead producing modified members along with the reference on subsequent connections.

The various methods and apparatuses described herein enhance computing efficiency by reducing the amount of processing resources that would ordinarily be expended copying data structures while still maintaining the convenience of using structured data in a dataflow program.

The invention has been described with reference to particular embodiments. However, it will be readily apparent to those skilled in the art that it is possible to embody the invention in specific forms other than those of the embodiment described above.

For example, it was earlier described how connections can be modeled as FIFOs. However, in some classes of dataflow programs, there exists a static schedule of actor firings. In such cases, it is possible to use static buffers instead of FIFOs.

The key difference, compared to the general case, is that static storage locations (i.e., those that are known beforehand, at compiler-time) can be used. This would affect aspects such as the implementation of a reference to a structure and how the presence of an input is communicated and guaranteed.

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of processing a dataflow program by a program development tool, the method comprising:
   the program development tool performing:
      retrieving stored dataflow program instructions from a memory;
      detecting a pair of actors defined by the retrieved dataflow program instructions, wherein the pair of actors comprise a producer actor and a consumer actor, wherein the producer actor supplies a data structure to the consumer actor via a path that comprises at least one connection and none or more intervening other actors;
      performing an analysis that comprises analyzing one or more operations of the producer actor that involve the data structure and/or analyzing one or more operations of the consumer actor that involve the data structure;
      based on a result of the analysis, selecting a minimal amount of information from among a plurality of data handling strategies concerning the data structure; and
      producing a transformed program in which the selected minimal amount of information is caused to be passed from the producer actor to the consumer actor,
   wherein:
   the data structure comprises a plurality of members; and
   analyzing one or more operations of the consumer actor comprises ascertaining whether only a subset of input data structure members consisting of fewer than all of the input data structure members is needed for the consumer actor to fire.

2. The method of claim 1, wherein analyzing one or more operations of the producer actor comprises ascertaining whether the producer actor modifies the data structure.

3. The method of claim 1, wherein:
   the data structure comprises a plurality of members; and
   analyzing one or more operations of the producer actor comprises ascertaining whether the producer actor modifies some but not all of the members of the data structure.

4. The method of claim 1, wherein analyzing one or more operations of the consumer actor comprises ascertaining whether the consumer actor needs to know only whether the data structure is present in order for the consumer actor to fire.

5. The method of claim 1, wherein:
   the data structure comprises a plurality of members; and
   the plurality of data handling strategies concerning the data structure includes a subset of input data structure members consisting of fewer than all of the input data structure members.

6. The method of claim 1, wherein:
   the data structure comprises a plurality of members; and
   the plurality of data handling strategies concerning the data structure includes a combination of a subset of data structure members consisting of fewer than all of the data structure members and a reference to remaining data structure members that are not in the subset of data structure members.

7. The method of claim 1, wherein the plurality of data handling strategies concerning the data structure includes a reference to the data structure.

8. The method of claim 1, wherein the plurality of data handling strategies concerning the data structure includes an indicator of data structure presence that does not include any data structure values.

9. The method of claim 1, wherein the path comprises one or more intervening other actors, and the analysis comprises:
   analyzing one or more operations of the one or more intervening other actors that involve the data structure.

10. The method of claim 1, wherein:
   the analysis comprises:
     ascertaining whether the producer actor generates a modified member of a data structure; and
     if the producer actor generates the modified member of the data structure, ascertaining whether the producer actor can replace an original member of the data structure with the modified member of the data structure; and
   producing the transformed program in which the selected minimal amount of information is caused to be passed from the producer actor to the consumer actor comprises:
     producing the transformed program such that the transformed program defines the producer actor replacing the original member of the data structure with the modified member of the data structure if a predicate is satisfied, wherein the predicate includes whether the producer actor can replace the original member of the data structure with the modified member of the data structure.

11. The method of claim 1, wherein the analysis comprises performing a live member analysis to determine whether one or more members of the data structure are live on the at least one connection of the path.

12. The method of claim 1, wherein the analysis comprises:
   determining connections of the path over which the data structure is capable of being represented as a reference; and
   determining, over each of the connections of the path, what members of the data structure, if any, have a potential of being modified prior to reaching the consumer actor.

13. The method of claim 1, wherein producing the transformed program in which the selected minimal amount of information is caused to be passed from the producer actor to the consumer actor comprises producing source code of a transformed dataflow program.

14. The method of claim 1, wherein the analysis comprises iteratively analyzing connections of the path such that if there is a connection, c, on which a total size of modified members of the data structure exceeds a threshold value, then one or more predecessor actors of the connection c are added to a set of actors that will construct a reference to the data structure.

15. An apparatus for processing a dataflow program, the apparatus comprising:
   program development tool processing circuitry configured to perform:
     retrieving stored dataflow program instructions from a memory;
     detecting a pair of actors defined by the retrieved dataflow program instructions, wherein the pair of actors comprise a producer actor and a consumer actor, wherein the producer actor supplies a data structure to the consumer actor via a path that comprises at least one connection and none or more intervening other actors;
     performing an analysis that comprises analyzing one or more operations of the producer actor that involve the data structure and/or analyzing one or more operations of the consumer actor that involve the data structure;
     based on a result of the analysis, selecting a minimal amount of information from among a plurality of data handling strategies concerning the data structure; and
     producing a transformed program in which the selected minimal amount of information is caused to be passed from the producer actor to the consumer actor,
   wherein:
     the data structure comprises a plurality of members; and
     analyzing one or more operations of the consumer actor comprises ascertaining whether only a subset of input data structure members consisting of fewer than all of the input data structure members is needed for the consumer actor to fire.

16. The apparatus of claim 15, wherein analyzing one or more operations of the producer actor comprises ascertaining whether the producer actor modifies the data structure.

17. The apparatus of claim 15, wherein:
   the data structure comprises a plurality of members; and
   analyzing one or more operations of the producer actor comprises ascertaining whether the producer actor modifies some but not all of the members of the data structure.

18. The apparatus of claim 15, wherein analyzing one or more operations of the consumer actor comprises ascertaining whether the consumer actor needs to know only whether the data structure is present in order for the consumer actor to fire.

19. The apparatus of claim 15, wherein:
   the data structure comprises a plurality of members; and
   the plurality of data handling strategies concerning the data structure includes a subset of input data structure members consisting of fewer than all of the input data structure members.

20. The apparatus of claim 15, wherein:
   the data structure comprises a plurality of members; and
   the plurality of data handling strategies concerning the data structure includes a combination of a subset of data structure members consisting of fewer than all of the data structure members and a reference to remaining data structure members that are not in the subset of data structure members.

21. The apparatus of claim 15, wherein the plurality of data handling strategies concerning the data structure includes a reference to the data structure.

22. The apparatus of claim 15, wherein the plurality of data handling strategies concerning the data structure includes an indicator of data structure presence that does not include any data structure values.

23. The apparatus of claim 15, wherein the path comprises one or more intervening other actors, and the analysis comprises:
   analyzing one or more operations of the one or more intervening other actors that involve the data structure.

24. The apparatus of claim 15, wherein:
   the analysis comprises:
     ascertaining whether the producer actor generates a modified member of a data structure; and
     if the producer actor generates the modified member of the data structure, ascertaining whether the producer actor can replace an original member of the data structure with the modified member of the data structure; and producing the transformed program in which the selected minimal amount of information is caused to be passed from the producer actor to the consumer actor comprises:

producing the transformed program such that the transformed program defines the producer actor replacing the original member of the data structure with the modified member of the data structure if a predicate is satisfied, wherein the predicate includes whether the producer actor can replace the original member of the data structure with the modified member of the data structure.

25. The apparatus of claim 15, wherein the analysis comprises performing a live member analysis to determine whether one or more members of the data structure are live on the at least one connection of the path.

26. The apparatus of claim 15, wherein the analysis comprises:

determining connections of the path over which the data structure is capable of being represented as a reference; and determining, over each of the connections of the path, what members of the data structure, if any, have a potential of being modified prior to reaching the consumer actor.

27. The apparatus of claim 15, wherein producing the transformed program in which the selected minimal amount of information is caused to be passed from the producer actor to the consumer actor comprises producing source code of a transformed dataflow program.

28. The apparatus of claim 15, wherein the analysis comprises iteratively analyzing connections of the path such that if there is a connection, c, on which a total size of modified members of the data structure exceeds a threshold value, then one or more predecessor actors of the connection c are added to a set of actors that will construct a reference to the data structure.

29. A non-transitory processor-readable storage medium having stored therein a set of instructions that when executed by one or more processors cause the one or more processors to perform a method of processing a dataflow program, the method comprising:

retrieving stored dataflow program instructions from a memory;

detecting a pair of actors defined by the retrieved dataflow program instructions, wherein the pair of actors comprise a producer actor and a consumer actor, wherein the producer actor supplies a data structure to the consumer actor via a path that comprises at least one connection and none or more intervening other actors;

performing an analysis that comprises analyzing one or more operations of the producer actor that involve the data structure and/or analyzing one or more operations of the consumer actor that involve the data structure;

based on a result of the analysis, selecting a minimal amount of information from among a plurality of data handling strategies concerning the data structure; and producing a transformed program in which the selected minimal amount of information is caused to be passed from the producer actor to the consumer actor, wherein:

the data structure comprises a plurality of members; and analyzing one or more operations of the consumer actor comprises ascertaining whether only a subset of input data structure members consisting of fewer than all of the input data structure members is needed for the consumer actor to fire.

* * * * *

UNITED STATES PATENT AND TRADEMARK OFFICE
CERTIFICATE OF CORRECTION

PATENT NO.        : 8,904,371 B2                                        Page 1 of 1
APPLICATION NO.   : 13/527568
DATED             : December 2, 2014
INVENTOR(S)       : Xu et al.

It is certified that error appears in the above-identified patent and that said Letters Patent is hereby corrected as shown below:

In the Specification

Column 2, Line 43, delete "km" and insert -- Jörn --, therefor.

Column 10, Line 58, delete "second actor 305." and insert -- second actor 303. --, therefor.

Column 12, Line 15, delete ""1")" and insert -- "1" --, therefor.

Column 13, Line 35, delete "there" and insert -- their --, therefor.

Column 13, Line 38, delete "there" and insert -- their --, therefor.

Column 16, Line 33, delete "s a" and insert -- s.a. --, therefor.

Signed and Sealed this
Twenty-first Day of July, 2015

Michelle K. Lee
*Director of the United States Patent and Trademark Office*